United States Patent
Nagata et al.

(10) Patent No.: US 7,440,042 B2
(45) Date of Patent: Oct. 21, 2008

(54) LIQUID CRYSTAL DISPLAY DEVICE

(75) Inventors: Tetsuya Nagata, Mobara (JP); Koji Hiraga, Ooamishirasato (JP); Masao Uehara, Mobara (JP); Koichi Fukuda, Mobara (JP)

(73) Assignee: Hitachi Displays, Ltd., Mobara-shi (JP)

( * ) Notice: Subject to any disclaimer, the term of this patent is extended or adjusted under 35 U.S.C. 154(b) by 0 days.

(21) Appl. No.: 11/776,048

(22) Filed: Jul. 11, 2007

(65) Prior Publication Data

US 2007/0258020 A1 Nov. 8, 2007

Related U.S. Application Data

(63) Continuation of application No. 10/629,559, filed on Jul. 30, 2003, now Pat. No. 7,245,338.

(30) Foreign Application Priority Data

Jul. 30, 2002 (JP) .............................. 2002-220607
Dec. 6, 2002 (JP) .............................. 2002-354496

(51) Int. Cl.
G02F 1/136 (2006.01)
(52) U.S. Cl. ....................................................... 349/43
(58) Field of Classification Search .................. 349/43, 349/138; 257/59, 72
See application file for complete search history.

(56) References Cited

U.S. PATENT DOCUMENTS

| | | | |
|---|---|---|---|
| 5,055,899 A * | 10/1991 | Wakai et al. .................. 257/61 |
| 5,233,211 A | 8/1993 | Hayashi |
| 5,910,271 A | 6/1999 | Ohe |
| 6,372,558 B1 | 4/2002 | Yamanaka |
| 6,433,841 B1 | 8/2002 | Murade |
| 6,583,830 B2 * | 6/2003 | Yasukawa et al. .............. 349/43 |
| 6,624,864 B1 * | 9/2003 | Kubo et al. .................. 349/139 |
| 6,636,284 B2 * | 10/2003 | Sato ........................... 349/110 |
| 6,657,689 B2 | 12/2003 | Baek |
| 6,777,716 B1 | 8/2004 | Yamazaki |
| 6,919,945 B2 | 7/2005 | Ha |

FOREIGN PATENT DOCUMENTS

| | | |
|---|---|---|
| JP | 62-299081 | 12/1987 |
| JP | 06-132306 | 5/1994 |
| JP | 2001-350158 | 12/2001 |
| JP | 2002-098960 | 4/2002 |
| JP | 2002-098963 | 4/2002 |

* cited by examiner

Primary Examiner—James A Dudek
(74) Attorney, Agent, or Firm—Antonelli, Terry, Stout & Kraus, LLP.

(57) ABSTRACT

A display device includes a glass substrate having a gate line, a drain line, a pixel electrode, and a thin film transistor. A silicon nitride film is formed on the glass substrate, and a silicon oxide film is formed on the silicon nitride film. The thin film transistor is formed on the silicon oxide film, and includes a poly-silicon film, a gate electrode which is electrically connected to the gate line, a drain electrode which connected to the drain line, and a source electrode which is electrically connected to the pixel electrode. A gate insulation film is formed between the silicon oxide film and the gate electrode, and an interlayer film is interposed between the gate insulation film and the pixel electrode. The silicon nitride film has a larger film thickness than that of the silicon oxide film, and the films are configured so as to reduce reflection.

3 Claims, 15 Drawing Sheets

|  | Material | d (nm) | n (Wave length : 555nm) |
|---|---|---|---|
| Orientation film/LC | Orientation film/LC |  | 1.5 |
| Transparent electrode | ITO | 77 | 2.0 |
| 2nd. insulating film | SiO2 | 200 | 2.0 |
| 1st. insulating film | SiO2 | 540 | 1.5 |
| Gate insulating layer | SiO2 | 100 | 1.5 |
| 2nd. lower layer | SiO2 | 100 | 1.5 |
| 1st. lower layer | SiN | 50~180 | 2.0 |
| Substrate | Glass |  |  |

| | Material | d (nm) | n (Wave length : 555nm) |
|---|---|---|---|
| Orientation film/LC | Orientation film/LC | 5200 | 1.5 |
| Transparent electrode | ITO | 140 | 2.0 |
| Passivation film | Organic film | 1730 | 1.6 |
| 2nd. insulating film | SiO2 | 300 | 1.85 |
| 1st. insulating film | SiO2 | 540 | 1.5 |
| Gate insulating layer | SiO2 | 100 | 1.5 |
| 2nd. lower layer | SiO2 | 100 | 1.5 |
| 1st. lower layer | SiN | 150 | 1.85 |
| Substrate | Glass | — | 1.5 |

LIQUID CRYSTAL DISPLAY DEVICE

CROSS REFERENCE TO RELATED APPLICATION

This application is a continuation application of U.S. application Ser. No. 10/629,559, filed Jul. 30, 2003, now U.S. Pat. No. 7,245,338, the contents of which are incorporated herein by reference.

BACKGROUND OF THE INVENTION

The present invention relates to a liquid crystal display device, and, more particularly, to a liquid crystal display device in which the contrast of an image is enhanced by preventing the reflection of external light.

A liquid crystal display device is used in a television receiver set, a personal computer, and as the display device for a portable terminal or the like. Since the liquid crystal display device is light in weight and exhibits a small power consumption, the liquid crystal display device is commonly used as a display device in a small electronic terminal, such as a mobile telephone or the like.

Further, since such a portable terminal is used outside of houses or buildings, a partial-transmissive-type liquid crystal display device is used. The partial-transmissive-type liquid crystal display device displays images by making use of external light when the outside environment is bright and displays images by making use of light from a backlight when the outside environment is dark (see Japanese Unexamined Patent Publication 350158/2001, for example). Further, even with respect to a liquid crystal display device which employs a full-transmissive-type panel, there is a liquid crystal display device which can produce a transmissive display which mainly uses light from a backlight and a reflective display which reflects light incident from an image observing side on a reflector of the backlight (see Japanese Unexamined Patent Publication 98960/2002 (paragraphs 0034 to 0043, FIG. 2 and FIG. 3) and Japanese Unexamined Patent Publication 98963/2002 (paragraphs 0001 to 0007, 0016 to 0017, FIG. 1, FIG. 3, FIG. 5, for example). Further, in many liquid crystal display devices, thin film transistors are used as switching elements.

Recently, to cope with the demand for a liquid crystal display device having a higher definition, the number of pixels of the liquid crystal display device has been increased. As a result of the increase in the number of pixels, thin film transistors which exhibit a high operational speed are required. In a liquid crystal display device having high definition polysilicon (polycrystalline silicon) is used in place of amorphous silicon as a semiconductor layer of the thin film transistor. With the use of polysilicon as the material of the semiconductor layer, the operational speed of the thin film transistor is increased, whereby images of high definition can be displayed.

Further, there is a known technique in which an upper-side background layer and a lower-side background layer are stacked on a glass substrate, laser beams are radiated to semiconductor thin films formed on the upper-side background layer, and the semiconductor thin films are crystallized (see Japanese Unexamined Patent Publication 132306/1994 (paragraphs 0002 to 0007, FIG. 1 to FIG. 4).

Usually, the thin film transistors are formed on the glass substrate and so-called alkali-free glass is used as a material of the glass substrate. This glass substrate includes impurities and the impurities intrude into the polysilicon film, so that the transistor characteristics of the thin film transistor formed on the substrate are degraded.

To suppress the intrusion of the impurities into the polysilicon film from the glass substrate, a background film made of silicon nitride, silicon oxide or the like is interposed between the glass substrate and the polysilicon film. The background film is formed over the whole surface of a panel and light-transmissive pixel electrodes are formed over the background film in addition to the thin film transistors. However, when the background film and the pixel electrodes are stacked, this gives rise to reflection of external light attributed to the difference in the refractive indices of the respective films.

In the conventional liquid crystal display device using the backlight, a background film is formed also in the light transmissive region. Accordingly, there has been a drawback in that, when the external light is reflected in the region where the light transmissive pixel electrodes are formed, the contrast of the images is lowered.

Further, in the partial-transmissive-type liquid crystal display device, the light reflective region and the light transmissive region are both formed in one pixel. Accordingly, when the image is displayed by making use of light from the backlight, the transmitting light is blocked by the reflective region, and, hence, the luminance of the screen is low. By adopting the full-transmissive panel structure having no reflective electrode in the pixel electrode and by reflecting the external light by use of the backlight, the luminance when the backlight is used can be enhanced. However, since such a display device is constituted by stacking the background film, the electrodes, the interlayer insulation films and the like, interface reflections attributed to the difference in refractive index occur on the interfaces of the respective films. Accordingly, with respect to the full-transmissive-type liquid crystal display device which reflects the external light by use of the backlight, there has been a drawback in that, when the images are displayed by the reflected light, an inverted image whose tint is inverted is displayed.

SUMMARY OF THE INVENTION

In a typical aspect of the liquid crystal display device of the present invention, in which there are thin film transistors and pixel electrodes formed on a substrate, the present invention is characterized in that each thin film transistor includes a silicon film, a gate electrode, and a source electrode which is electrically connected to a pixel electrode, disposed between the silicon film and the substrate and between the pixel electrode and the substrate, a silicon oxide film and a silicon nitride film which is formed between the silicon oxide film and the substrate are interposed, and a film thickness of the silicon nitride film is larger than a film thickness of the silicon oxide film.

Here, the liquid crystal display device of the present invention is also characterized in that the silicon nitride film satisfies the following formula, assuming that the film thickness is d(nm) and the refractive index for a wavelength of 555 nm is n (m being an arbitrary integer).

$$d-10 \leq 555 \times m/(2 \times n) \leq d+10$$

Further, the liquid crystal display device of the present invention is also characterized in that the silicon nitride film satisfies the following formula, assuming that the film thickness is d(nm) and the refractive index for a wavelength of 555 nm is n (m being an arbitrary integer).

$$0.9d \leq 555 \times m/(2 \times n) \leq 1.1d$$

Further, the liquid crystal display device of the present invention is also characterized in that the film thickness of the silicon nitride film falls within a range of 130 nm to 160 nm.

Alternatively, the film thickness of the silicon nitride film falls within a range of 126 nm to 165 nm.

Further, according to another typical aspect of the liquid crystal display device of the present invention, thin film transistors and light transmissive pixel electrodes are formed over a substrate, the thin film transistors are constituted of a polysilicon film, a gate electrode, a drain electrode and a source electrode, the substrate includes a background film, the polysilicon film and the light transmissive pixel electrode are arranged over the background film, the background film is constituted of a substrate-side silicon nitride film and a liquid-crystal-layer-side silicon oxide film, and the silicon nitride film is thicker than the silicon oxide film.

Here, the silicon nitride film satisfies the following formula, assuming that the film thickness thereof is d(nm) and the refractive index for a wavelength of 555 nm is n.

$$d-10 \leq 555 \times m/(2 \times n) \leq d+10$$

Further, between the substrate-side silicon nitride film and the light transmissive pixel electrode, a silicon oxide film and a second silicon nitride film are sequentially stacked. The interlayer insulation film between the silicon oxide film and the second silicon nitride film respectively satisfy the following formula, assuming that the film thickness thereof is d(nm) and the refractive index thereof for a wavelength of 555 nm is n (m being an arbitrary integer).

$$d-10 \leq 555 \times m/(2 \times n) \leq d+10$$

Further, the silicon oxide film arranged between the substrate-side silicon nitride film and the light transmissive pixel electrode is constituted of a liquid-crystal-side background film, a gate insulation film, and an interlayer insulation film and the second silicon nitride film is an interlayer insulation film.

Another constitution of the liquid crystal display device of the present invention is characterized in that, of the two substrates which face each other with a liquid crystal layer disposed therebetween, one substrate includes thin film transistors and the thin film transistors are constituted of a semiconductor layer, a gate electrode which is connected to a gate line, a drain electrode which is connected to a drain line and a source electrode which is connected to a pixel electrode. Further, in a region defined by two neighboring gate lines and two neighboring drain lines, there is a reflective region, which is provided with a reflective electrode which reflects external light that passes through the liquid crystal layer and which is connected to the source electrode, and a transmissive region that is provided with a light transmissive pixel electrode which is connected to the source electrode and allows light from a backlight to pass therethrough, wherein the thickness of the liquid crystal layer differs between the reflective region and the transmissive region. Further, a first film and a second film are formed between the light transmissive pixel electrode of the transmissive region and the substrate, such that the refractive index differs between the first film and the second film, and the first film and the second film respectively satisfy the following formula, assuming that the film thickness thereof is d(nm) and the refractive index for a wavelength of 555 nm is n (m being an arbitrary integer).

$$d-10 \leq 555 \times m/(2 \times n) \leq d+10$$

Here, the liquid crystal display device of the present invention is also characterized in that the first film is made of silicon nitride and the second film is made of silicon oxide.

Further, the liquid crystal display device of the present invention is also characterized in that a third film made of silicon nitride is formed on a second film and the third film satisfies a following formula, assuming a film thickness thereof as d(nm) and a refractive index when a wavelength is 555 nm as n (m being an arbitrary integer).

$$d-10 \leq 555 \times m/(2 \times n) \leq d+10$$

Further, another liquid crystal display device of the present invention is provided in the form of a full transmissive type liquid crystal display device, which includes a liquid crystal panel in which two substrates face each other in an opposed manner with a liquid crystal layer disposed therebetween, and a backlight which is formed on one surface side of the liquid crystal panel, wherein one substrate includes a background film, thin film transistors and light transmissive pixel electrodes formed over the background film, and the thin film transistor includes a polysilicon film, a gate electrode, a drain electrode and a source electrode. Here, the background film includes a substrate-side silicon nitride film and a liquid-crystal-layer-side silicon oxide film, and the silicon nitride film is formed to be thicker than silicon oxide film. Further, the silicon nitride film satisfies the following formula, assuming that the film thickness thereof is d (nm) and the refractive index for a wavelength of 555 nm is n (m being an arbitrary integer).

$$0.9d \leq 555 \times m/(2 \times n) \leq 1.1d$$

Further, between the background film and the pixel electrode, a silicon oxide film and a second silicon nitride film are sequentially stacked, and the silicon oxide film and the second silicon nitride film satisfy the following formula, assuming that the film thickness thereof is d (nm) and the refractive index for a wavelength of 555 nm is n (m being an arbitrary integer).

$$0.9d \leq 555 \times m/(2 \times n) \leq 1.1d$$

Further, in addition to the above-mentioned constitutions, common electrodes are formed on the same substrate on which the pixel electrodes are formed or the common electrodes are formed on the other substrate.

According to the present invention, it is possible to provide a display device which can provide an enhanced contrast and, thereby, can enhance the visibility of images.

DESCRIPTION OF THE PREFERRED EMBODIMENTS

Preferred embodiments of the present invention will be explained hereinafter in conjunction with the drawings.

Figure 1:
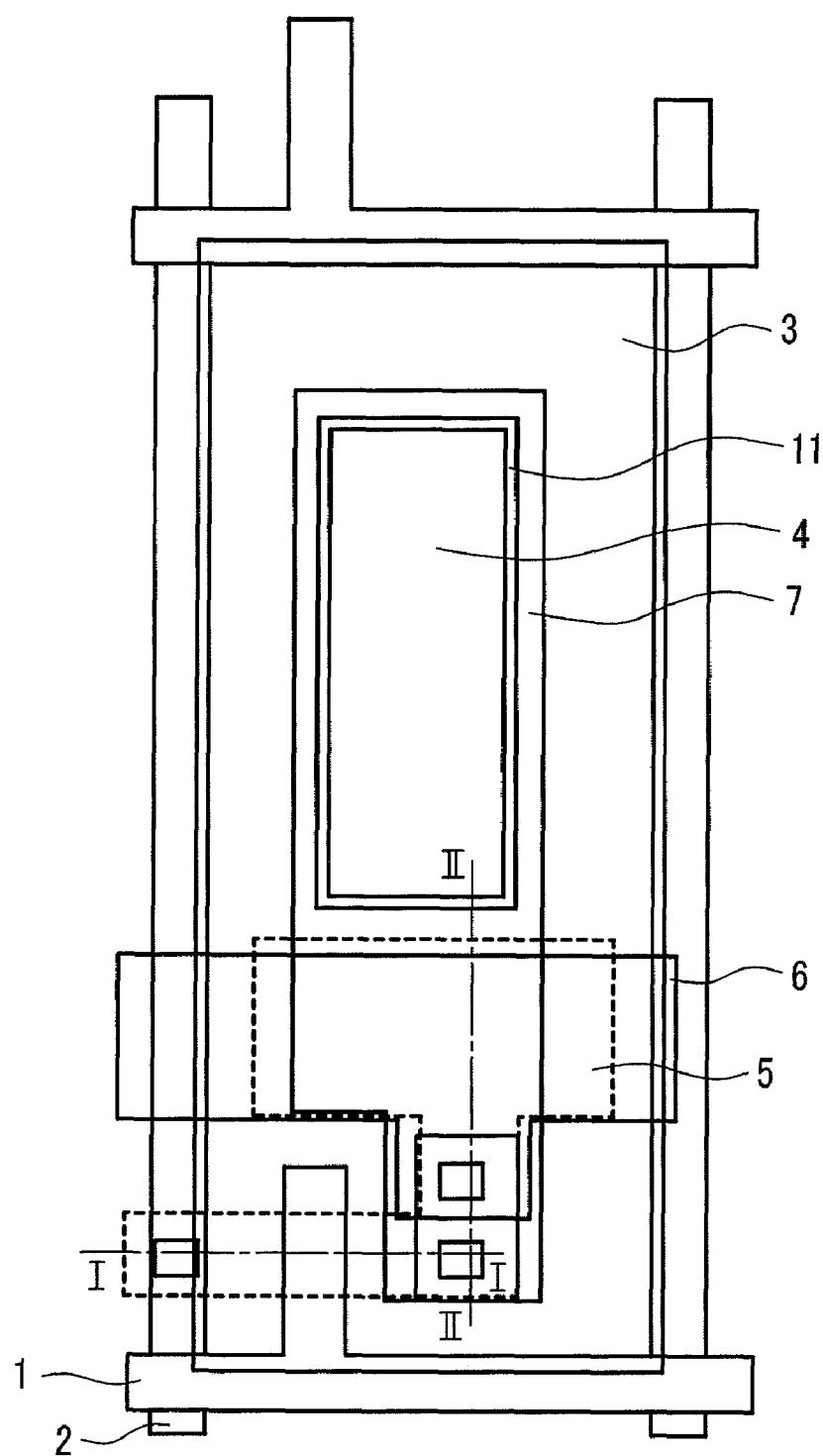
FIG. 1 is a diagrammatic plan view of a pixel portion of a liquid crystal display device of the present invention.

FIG. 1 is a plan view showing a pixel portion of a liquid crystal display device representing a first embodiment of the present invention.

In a typical liquid crystal display device, two substrates which are arranged to face each other with a liquid crystal layer disposed therebetween, and thin film transistors are formed on one substrate. Further, on each region which is defined by a pair of adjacent gate lines and a pair of adjacent drain lines which cross each other, a switching element, which is turned on in response to a scanning signal from the gate line, and a pixel electrode, to which a video signal is supplied from the drain line through the switching element, are formed, thus constituting a so-called pixel. The region which is defined by the pair of adjacent gate lines and the pair of adjacent drain lines constitutes a pixel region. The thin film transistor is used as a switching element.

The pixel illustrated in FIG. 1 is formed in the region surrounded by two neighboring gate lines 1 and two neighboring drain lines 2. A color image can be displayed on a front surface of a panel using an array of three types of pixels (pixel for red, pixel for green, pixel for blue).

Within one pixel, there is a light reflective region, in which a reflective electrode 3 is formed, and a light transmissive region 4, on which a reflective electrode is not formed. The light transmissive region 4 is formed by providing an opening in the reflective electrode 3. A transparent electrode 7 is formed in the light transmissive region 4. The pixel electrode is constituted of the reflective electrode 3 and the transparent electrode 7.

Below the reflective electrode 3, the gate line (gate electrode) 1, the drain line (drain electrode) 2, a polysilicon film 5, a storage line (storage electrode) 6 and the transparent electrode 7 are formed.

Figure 2:
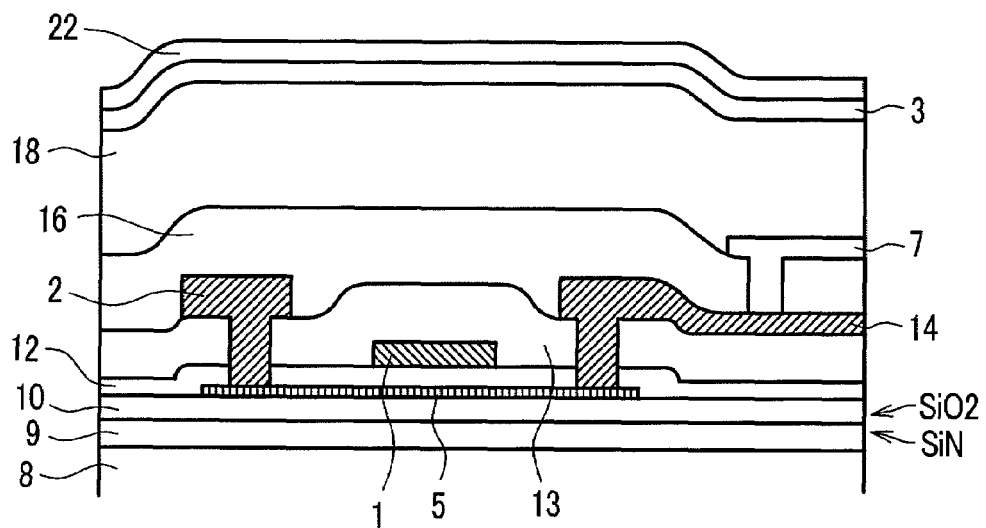
FIG. 2 is a cross-sectional view taken along a line I-I in FIG. 1.

FIG. 2 is a cross-sectional view taken along a line I-I in FIG. 1. A first background film 9 is formed on the substrate 8 on which the thin film transistors are formed, and a second background film 10 is formed on the first background film 9. Then, the polysilicon film 5 is formed on the second background film 10.

The polysilicon film 5 can be formed using either solid-phase crystallization or a laser annealing method. Since solid-phase crystallization heats the whole substrate at a high temperature, it is necessary to use a material which exhibits high resistance against heat, such as quartz glass. On the other hand, in the laser annealing method, an amorphous silicon layer is formed on a glass substrate by annealing using laser beams. Accordingly, it is unnecessary to heat the whole substrate to a high temperature. The polysilicon film which can be formed at a low temperature, compared to that obtained with the use of solid-phase crystallization, is formed on a glass substrate, which is referred to as alkali-free glass. This glass substrate includes impurities. To prevent the impurities from intruding into the polysilicon film, a background film is formed on the glass substrate.

In forming the polysilicon film, by crystallizing polysilicon on a silicon oxide film, it is possible to form a polysilicon layer having small grain boundaries. However, to suppress the intrusion of the impurities into the silicon oxide film from the glass substrate, it is necessary to increase the thickness of the silicon oxide film.

In view of the above, a silicon nitride film is used as the first background film 9. Although a silicon nitride film is not favorable for the formation of the polysilicon film 5, the silicon nitride film can suppress the intrusion of impurities into the polysilicon film from the glass substrate 8. Accordingly, it is possible to suppress the degradation of transistor characteristics attributed to the diffusion of sodium or the like from the glass substrate.

A silicon oxide film is formed as the second background film 10. By forming the polysilicon film 5 on the oxide silicon film, it is possible to form crystallized silicon having a large particle size. Further, due to the formation of the oxide film, it is possible to prevent fluctuation of the threshold voltage of the transistor.

By forming a silicon nitride film as the first background film 9 and by forming a silicon oxide film as the second background film 10, it is possible to form the thin background film as a whole. With a thinner background film, it is possible to form the background film with only a small undulation or waving, and, hence, it is possible to reduce any changes in the film thickness.

A gate insulation film 12 is formed such that the film 12 covers the polysilicon film 5. Gate electrodes 1 are formed on the gate insulation film 12. The gate insulation film 12 is arranged to provide an insulation between the polysilicon film 5 and the gate electrodes 1. In this embodiment, the gate insulation film 12 is formed of a silicon oxide film and the gate electrode 1 is made of a molybdenum tungsten alloy.

Over the gate insulation film 12, a first interlayer insulation film 13 is formed such that the film 13 covers the gate lines 1. The first interlayer insulation film 13 is formed of a silicon oxide film and is mainly used for insulation between the gate electrodes 1 and the drain electrodes 2 or the source electrodes 14.

Contact holes 15 are formed in the gate insulation film 12 and the first interlayer insulation film 13. Here, the drain electrodes 2 and the semiconductor layers 5 are connected to each other via the contact holes 15, while the source electrodes 14 and the semiconductor layers 5 are also connected to each other via the contact holes 15. In this embodiment, the drain electrode 2 and the source electrode 14 have a three-layered structure consisting of an upper layer made of titanium, an intermediate layer made of aluminum and a lower layer made of titanium (titanium/aluminum/titanium). By arranging the titanium layer at the upper layer and the lower layer, the electric connection between the polysilicon film 5 and the transparent electrode (ITO) 7 is ensured.

Over the first interlayer insulation film 13, a second interlayer insulation film 16 is formed such that the film 16 covers the drain electrodes 2 and the source electrodes 14. The second interlayer insulation film 16 is formed of a silicon nitride film. With the use of a silicon nitride film as the second interlayer insulation film 16, it is possible to prevent the intrusion of the contaminating matter into the thin film transistor from an organic insulation film 18, and, at the same time, it is possible to enhance the adhesiveness between the organic insulation film 18 and the second interlayer insulation film.

Over the second interlayer insulation film 16, the transparent electrodes 7 are formed. Contact holes 15 are formed in the second interlayer insulation film 16 so as to establish an electrical connection between the source electrodes 14 and the transparent electrodes 7. The transparent electrodes 7 are made of ITO (Indium Tin Oxide).

Over the second interlayer insulation film 16, a third interlayer insulation film 18 is formed such that the film 18 partially covers the transparent electrodes 7. The third interlayer insulation film 18 is made of an organic material (an organic insulation film). By arranging the organic insulation film 18 over the second interlayer insulation film 16, it is possible to reduce the coupling capacitance between wiring, such as the gate lines, or between the drain lines. Due to a reduction of the coupling capacitance, it is possible to reduce the power consumption of the liquid crystal display device.

Over the third interlayer insulation film 18, the reflective electrodes 3 are formed. The reflective electrode 3 has a two-layered structure (titanium-tungsten alloy/aluminum) consisting of an upper layer made of a titanium-tungsten alloy and a lower layer made of aluminum. The titanium-tungsten alloy ensures an electrical connection between the reflective electrode 3 and the transparent electrode 7.

Figure 3:
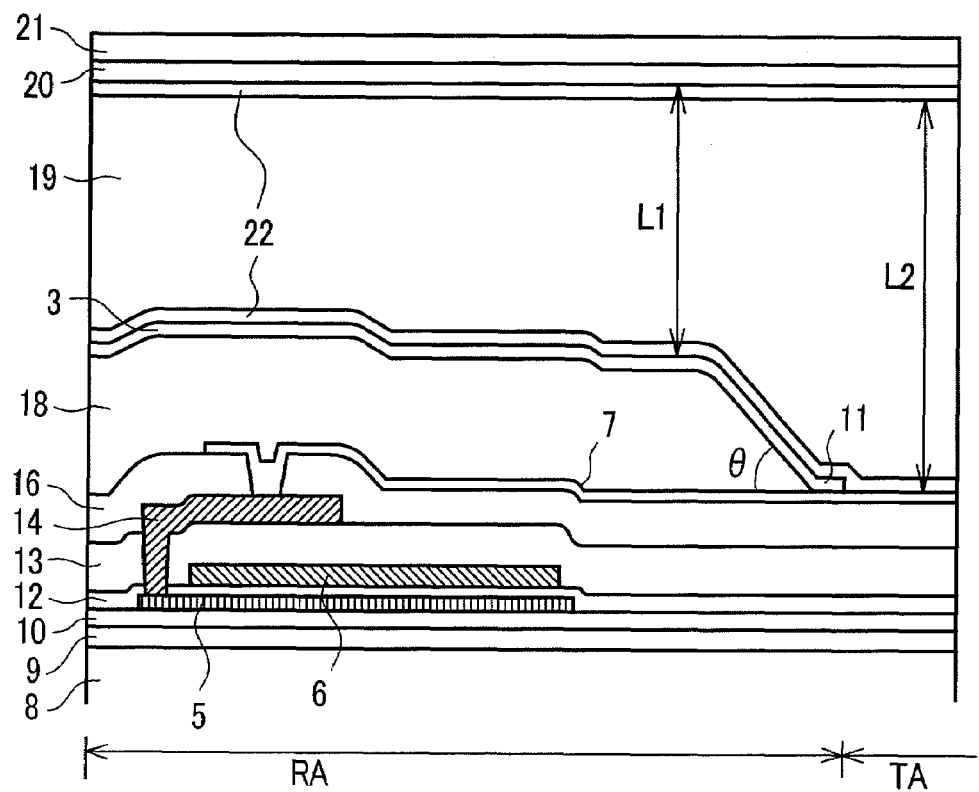
FIG. 3 is a cross-sectional view taken along a line II-II in FIG. 1.

FIG. 3 is a cross-sectional view taken along a line II-II in FIG. 1. A region on which the reflective electrode 3 is formed constitutes a reflective region AR, and a region on which the reflective electrode 3 is not formed constitutes a transmissive region TA.

The first background film 9 and the second background film 10 are formed on the glass substrate 8. These background films are formed over the whole pixel region. When the background films are removed during the course of the step of forming the low-temperature silicon, in the succeeding photolithography step, a developing solution, an etchant, a resist removing liquid or the like is directly brought into contact with the glass substrate. Accordingly, ions, such as sodium ions or the like, in the glass substrate are dissolved.

Due to the provision of the background films, the developing solution, the etchant, the resist removing liquid or the like is not brought into contact with the glass substrate in the photolithography step, and, hence, it is possible to reuse these liquids again after filtering them, whereby it is possible to prevent the whole manufacturing line from being subjected to contamination. Further, the manufacturing cost can be reduced.

The polysilicon film 5 is formed over the second insulation background film and the first interlayer insulation film 13 is formed over the second background film such that the insulation film 13 covers the polysilicon film 5. Over the first interlayer insulation film, storage electrodes 6 are formed. The storage electrode 6 faces the source electrode 14 and the transparent electrode 7 by way of the insulation film in an opposed manner, thus forming a holding capacitance.

Further, since the storage electrode 6 is formed within the reflective region RA, it is unnecessary to allow light to pass therethrough. Accordingly, the storage electrode 6 is formed of a molybdenum-tungsten film.

The third interlayer insulation film 18 includes an opening at a portion thereof. As shown in FIG. 1, the reflective electrode 3 forms an opening 4 by tracing the opening formed in the third interlayer insulation film 18. The reflective electrode 3 includes a connection portion 11 in the opening in the third interlayer insulation film 18. The reflective electrode 3 is electrically connected with the transparent electrode 7 through the connecting portion 11.

Further, an inclined portion 17 having an angle θ is formed in the third interlayer insulation film 18 between the reflective electrode 3 and the transparent electrode 7. The angle θ is smaller than 90 degrees and is about 45 degrees. By forming such an inclined portion 17, rubbing mottling on the orientation film can be reduced.

The transparent electrode 7 is formed in an area that is wider than the opening 4 formed in the reflective electrode 3. A backlight (not shown in the drawing) is arranged below the glass substrate and the transparent electrode 7 constitutes a light transmissive pixel electrode which allows light from the backlight to pass therethrough.

The pixel portion faces the counter substrate 21 that is provided with the counter electrodes 20, with the liquid crystal layer 19 being disposed therebetween. Further, the thickness (a gap) of the liquid crystal layer differs between the gap L1 of the reflective region and the gap L2 of the transmissive region. That is, the thickness of the liquid crystal layer differs between the reflective region and the transmissive region.

In this embodiment, the above-mentioned constitution is applied to a liquid crystal display device for normally black display. The liquid crystal display device for normally black display exhibits a higher transmissivity than a liquid crystal display device for normally white display, and, hence, the liquid crystal display device can use thick color filters, producing a liquid crystal display device that produces excellent color reproducibility. Further, by setting the gap L2 of the transparent region so that it is larger than the gap L1 of the reflective region, the luminance can be enhanced.

In the transmissive region, light transmissive films are stacked, and these stacked films differ in refractive index from each other. The thicknesses of the light transmissive films are controlled to prevent the reflection of external light from the counter substrate side.

In the transmissive region, between the transparent electrode 7 and the glass substrate 8, the first background film 9, the second background film 10, the gate insulation film 12 and the first interlayer insulation film 13 are arranged.

These films are respectively configured to satisfy the following formula, assuming the film thickness is d(nm) and the refractive index for a wavelength of 555 nm is n (m being an arbitrary integer excluding a negative integer).

$$d-10 \leq 555 \times m/(2 \times n) \leq d+10$$

Due to such a constitution, the reflection of the external light in the transmissive region can be suppressed whereby it is possible to provide a liquid crystal display device in which the contrast is enhanced.

Figures 4, 5:
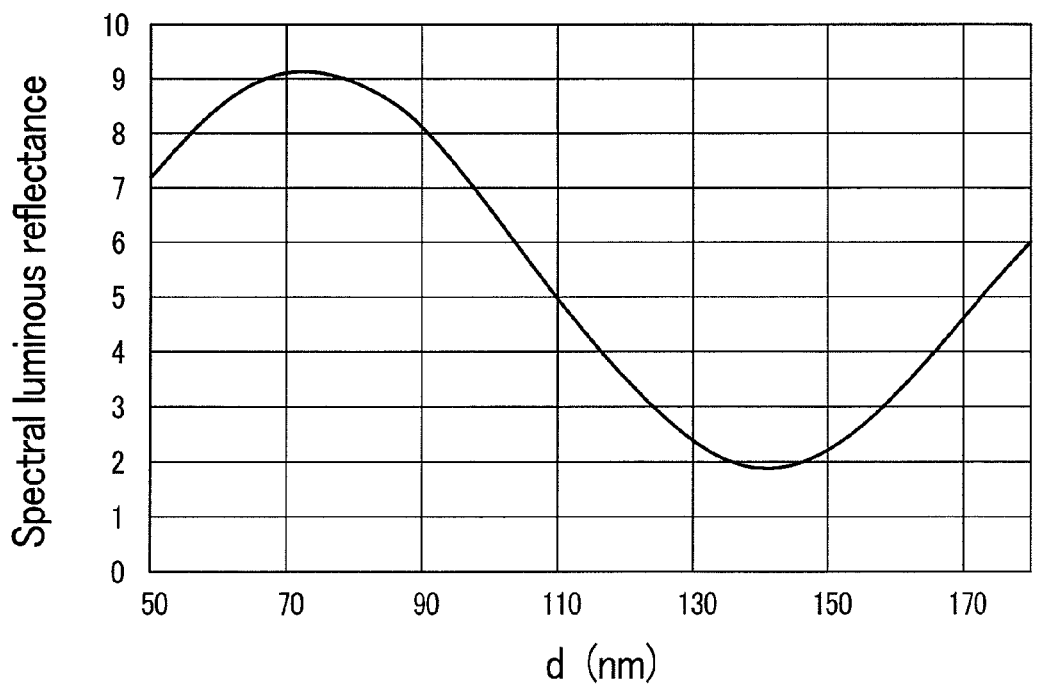
FIG. 4 is a table showing examples of the material and the thickness of films or layers and refractive indices when the wavelength is 555 nm.
FIG. 5 is a graph showing a spectral luminous reflectance when the thickness of a first background film is changed from 50 nm to 180 nm.

FIG. 4 shows a specific example of materials, thicknesses (film thicknesses) of respective films or layers and the refractive indices when the wavelength is 555 mm. In this embodiment, the gap L2 of the transmissive region is set to 5.2 μm and the gap L1 of the reflective region is set to 3.7 μm.

The first background film and the second background film differ in the refractive index thereof. To protect the polysilicon film from the impurities in the glass substrate, the first background film may preferably have a film thickness of at least 45 nm. In this embodiment, the material of the first background film 9 is silicon nitride, the refractive index of the first background film 9 is 2.0, and the film thickness of the first background film 9 is 130 nm to 150 nm. The material of the second background film 10 is silicon oxide, the refractive index of the second background film 10 is 1.5, and the film thickness of the second background film 10 is 100 nm. The first background film is formed so as to be thicker than the second background film.

The material of the gate insulation film 12 is silicon oxide in the same manner as the second background film, while the refractive index of the gate insulation film 12 is 2.0 and the film thickness of the gate insulation film 12 is 100 nm. The material of the first interlayer insulation film 13 is silicon oxide in the same manner as the second background film, while the refractive index of the first interlayer insulation film 13 is 2.0 and the film thickness of the first interlayer insulation film 13 is 540 nm. With respect to the second interlayer insulation film 16, the material is silicon nitride, the refractive index is 2.0 and the film thickness is 200 nm. With respect to the transparent electrode, the material is ITO, the refractive index is 2.0 and the film thickness is 77 nm. Further, the refractive indices of the orientation film 22 and the liquid crystal are 1.5.

Among these films, the second background film, which constitutes the liquid-crystal-layer-side background film, has the same refractive index as that of the gate insulation film and the first interlayer insulation film, and, hence, they can be considered as the same films. Further, since the second interlayer insulation film and the transparent electrode have the same refractive index, these films are also considered to be the same film. Accordingly, the first film is the silicon nitride film, which is constituted of the first background film, and, hence, the refractive index is 2.0 and the film thickness is 130 to 150 nm. The second film is the silicon oxide film, which is constituted of the second background film, the gate insulation film and the first interlayer insulation film, and, hence, the refractive index is 1.5 and the film thickness is 740 nm. Further, the third film has a refractive index of 2.0 and a film thickness of 277 mm.

The above-mentioned films satisfy the following formula, assuming that the film thickness is d (nm) and the refractive index for a wavelength of 555 nm is n (m being an arbitrary integer excluding negative integer).

$$d-10 \leq 555 \times m/(2 \times n) \leq d+10$$

Due to such a constitution, the reflection of the external light in the transmissive region can be suppressed, whereby it is possible to provide a liquid crystal display device in which the contrast is enhanced.

It is more preferable to set the thickness of the first background film to 140 nm.

Figure 6:
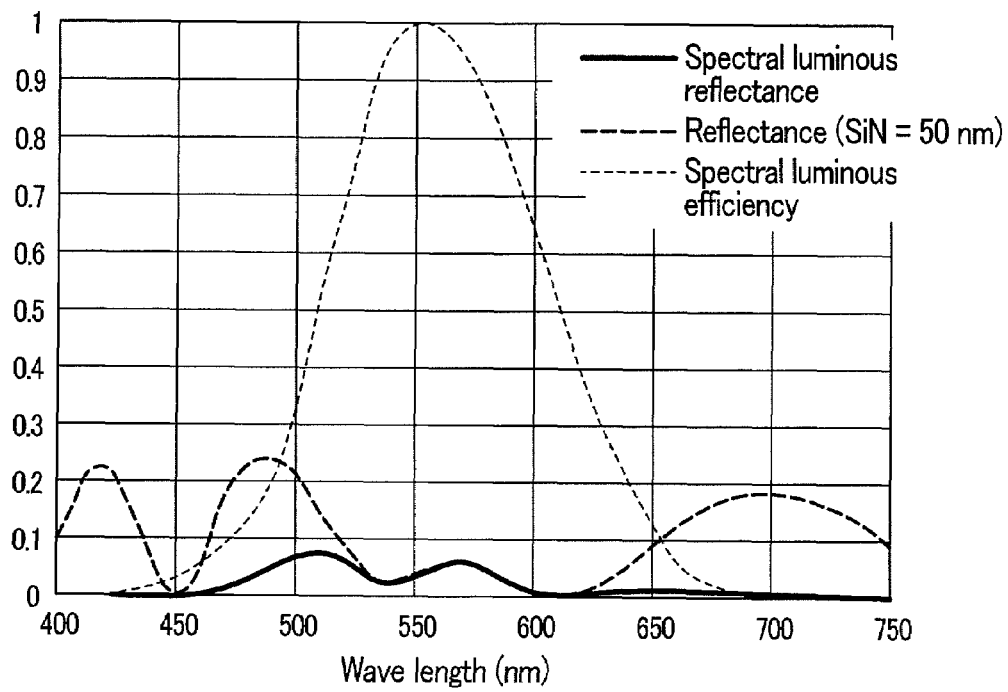
FIG. 6 is a graph showing the relationship between the wavelength of light and the spectral luminous reflectance when the thickness of the first background film shown in FIG. 5 is 50 nm.
Figure 7:
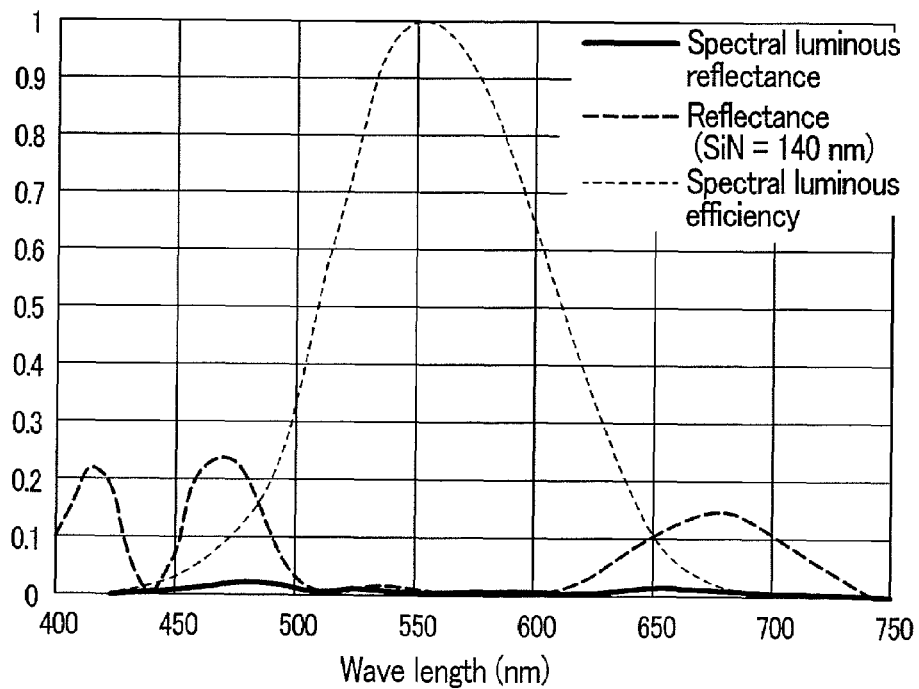
FIG. 7 a graph showing the relationship between the wavelength of light and the spectral luminous reflectance when the thickness of the first background film shown in FIG. 5 is 140 nm.

FIG. 5 is a graph showing the spectral luminous reflectance when the second background film, the gate insulation film, the first interlayer insulation film and the second interlayer insulation film assume the values shown in FIG. 4, and the film thickness of the first background film is changed within a range of 50 nm to 180 nm. FIG. 6 is a graph showing the relationship between the wavelength of light and the spectral luminous reflectance when the film thickness of the first background film in FIG. 5 is 50 nm. FIG. 7 is a graph showing the relationship between the wavelength of light and the spectral luminous reflectance when the film thickness of the first background film in FIG. 5 is 140 nm.

As can be clearly understood from FIG. 5, FIG. 6 and FIG. 7, the spectral luminous reflectance takes the minimum value when the film thickness of the background film is set to 140 nm.

This value agrees with a following equation, wherein the film thickness is d (nm) and the refractive index for a wavelength of 555 nm is n.

$$d=555 \times m/2 \times n$$

A human being is most sensitive to light having the wavelength of 555 nm, and, hence, the contrast can be enhanced by suppressing the reflection of light having a wavelength in the vicinity of 555 nm.

It is necessary to adjust the film thickness by adding about 10% of film thickness to the calculated value or subtracting about 10% of film thickness from the calculated value by considering manufacturing errors. The film thickness is preferably controlled to a value having an error of 10 nm.

Figure 8:
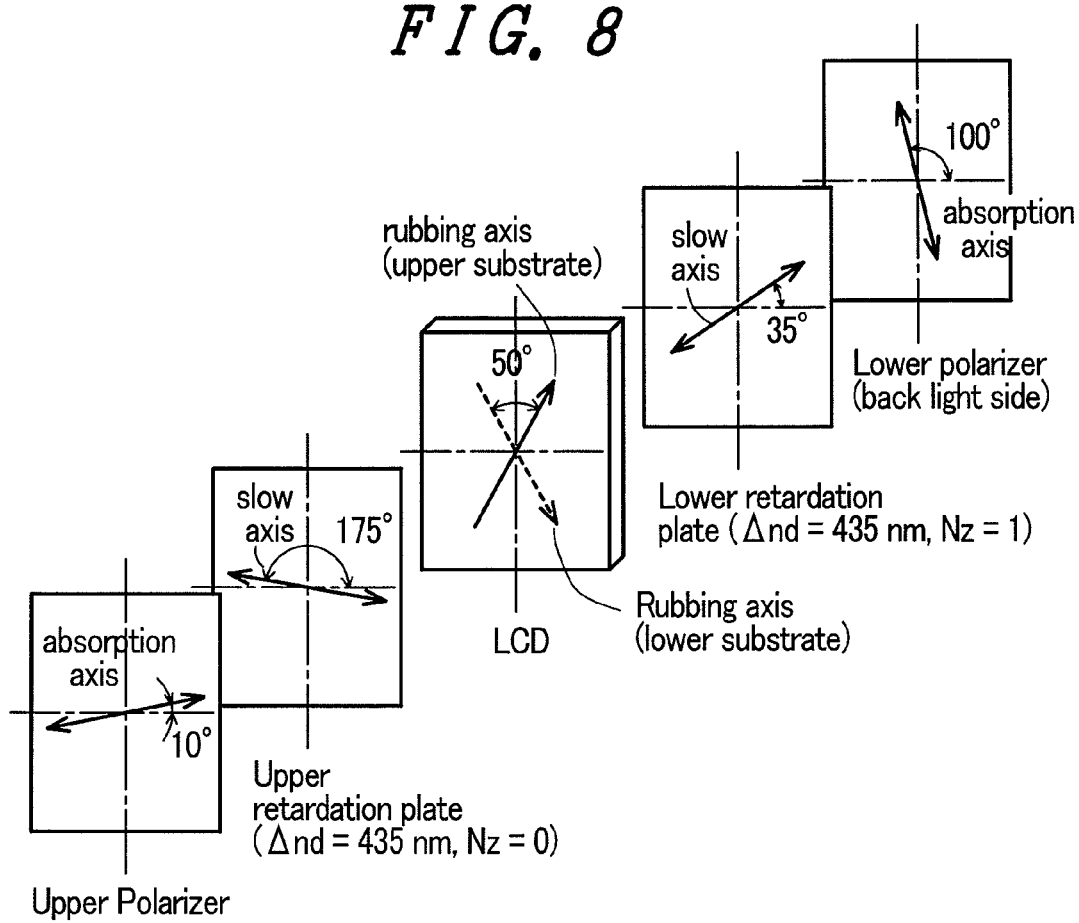
FIG. 8 is a view showing the constitution of films of a partial transmissive type liquid crystal display device for a normally black display.

FIG. 8 is view showing the film constitution of the partial transmissive type liquid crystal display device for producing a normally black display.

The thickness of the liquid crystal layer in the transmissive region is set, by taking the polarizer and the optical retardation plate into consideration, to a value such that the optimum transmissive optical characteristics, such as contrast and transmissivity, can be obtained with respect to the transmitting light which passes through the liquid crystal layer once. Further, the thickness of the liquid crystal layer in the reflective region is set, by taking the polarizer and the optical retardation plate into consideration, to a value such that the optimum transmissive optical characteristics, such as contrast and transmissivity, can be obtained with respect to the reflecting light which passes through the liquid crystal layer twice. Accordingly, when light which passes through the liquid crystal layer, the reflective electrode and the liquid crystal layer in this order is blocked by the optical retardation plate and the polarizer, so that a black display is produced, the reflective light from the transmissive region will differ in the thickness of the liquid crystal layer through which the light passes, and, hence, the light differs in retardation of the liquid crystal layer, whereby the light is in a polarized state in which the optical retardation plate and the polarizer cannot block the light.

That is, when there is no difference between the gap L2 of the transmissive region and the gap L1 of the reflective region, the retardation caused by the liquid crystal material is equal between the transmissive region and the reflective region, and, hence, the light is blocked by the optical retardation plate and the polarizer. However, when there is a difference between the gap L2 of the transmissive region and the gap L1 of the reflective region, the retardation caused by the liquid crystal material differs between the transmissive region and the reflective region, and, hence, the reflective light from the transmissive region cannot be blocked.

Figure 9:
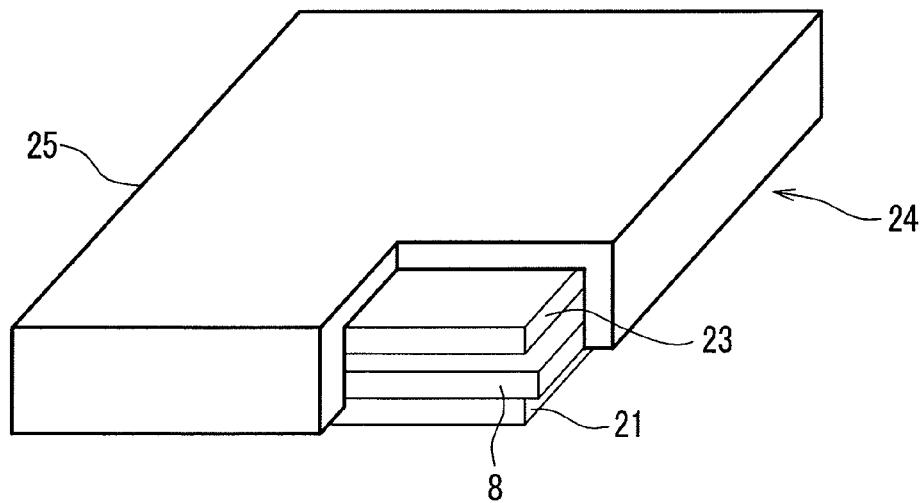
FIG. 9 is a perspective view with a part broken away of a liquid crystal display device to which the present invention is applied.

FIG. 9 is a perspective view, with a part broken away, of a liquid crystal display device 24 to which the present invention is applied. The liquid crystal display device 24 is constituted by a counter substrate 21 having an image display screen, a glass substrate 8, which is arranged to face the counter substrate 21 with a liquid crystal layer disposed therebetween, and a backlight assembly 23, which is arranged on a back surface of the glass substrate 8 in a frame 25.

In accordance with the present invention, it is possible to suppress the reflection of the external light in the transmissive region, and, hence, it is possible to enhance the contrast particularly in a liquid crystal display device in which there is a difference between the gap L2 of the transmissive region and the gap L1 of the reflective region.

The reflective light from the multilayered film is generated such that, since the refractive indices of the respective layers which constitute the multilayered film are different from each other, interface reflections occur between respective layers, and these interface reflections interfere with each other, thus generating the reflection light.

In the low-temperature polysilicon thin film transistor, the silicon oxide film, the silicon nitride film, the organic interlayer insulation film and ITO film are used. Among these films, by setting the optical thickness n×d (n: refractive index, d: film thickness) to 555/2 (nm) with respect to a film having a large refractive index, when the incident light has a wavelength in the green range, which exhibits the highest visibility, the phase of the reflective light becomes opposite from each other, and, hence, they are offset from each other at both interfaces of the film having the large refractive index, whereby the reflectance becomes small.

Further, by setting the film thickness of the silicon nitride film, which is used as the background film, to the above-mentioned value, as in the case of the previous embodiment, while holding the film thicknesses of the gate insulation film, the interlayer insulation film and the transparent electrode to film thicknesses that are most suitable for the electrical characteristics of the low-temperature polysilicon transistor and holding capacitances, the interface reflection can be reduced.

Figure 10:
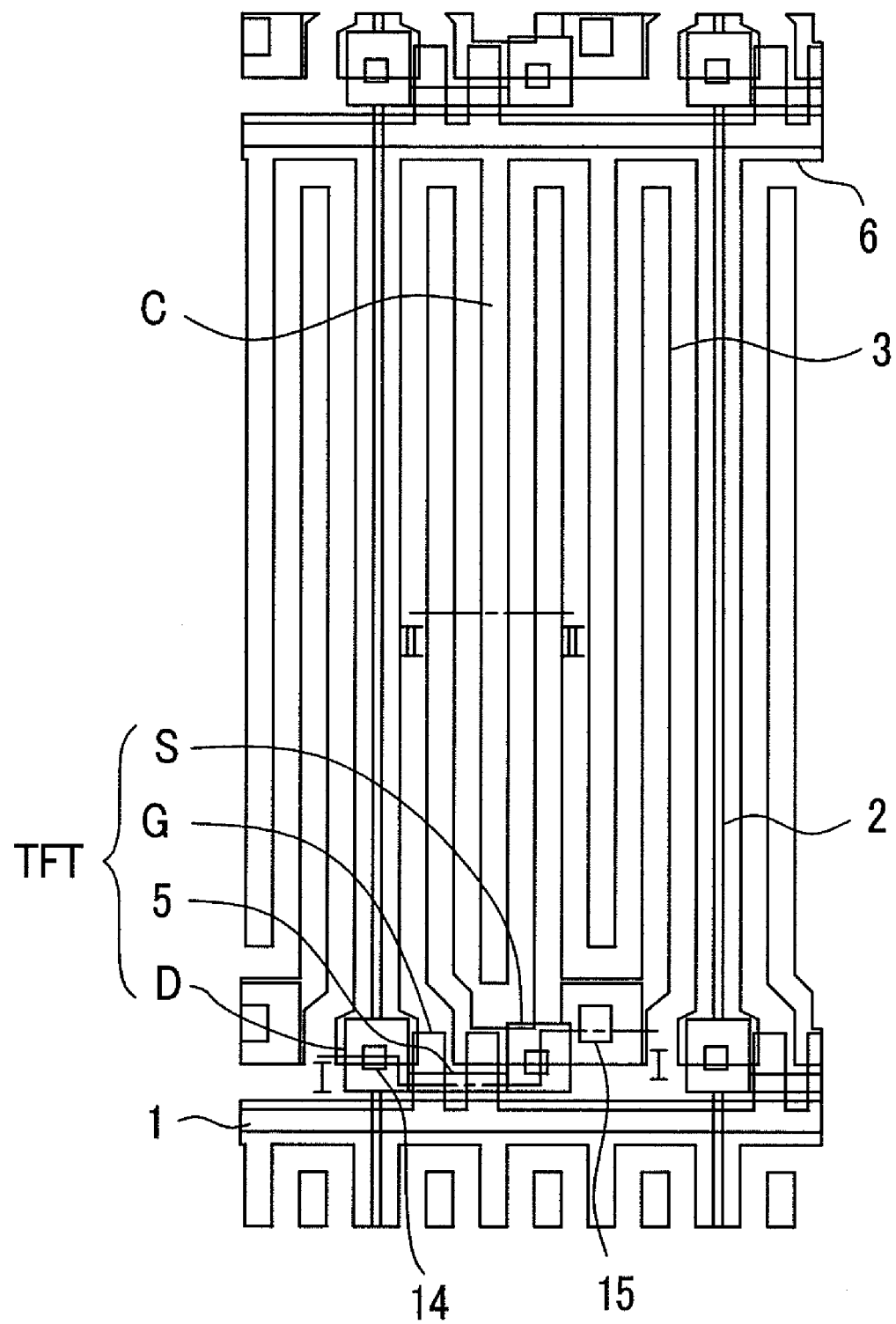
FIG. 10 is a diagrammatic plan view of a pixel portion of a liquid crystal display device representing a second embodiment of the present invention.

FIG. 10 is a plan view of a pixel portion of a liquid crystal display device according to a second embodiment of the present invention. Further, the embodiment shown in FIG. 10 is applicable to a full transmissive type display device, which is not provided with reflective electrodes for displaying images by reflecting an external light to the pixel portion.

In this display device, two substrates are arranged to face each other with a liquid crystal layer disposed therebetween, and thin film transistors are formed on one substrate (first substrate). Further, color filters are formed on the other substrate (second substrate).

On each region which is defined by a pair of gate lines 1 and a pair of drain lines 2 which cross each other, a switching element, which is turned on in response to a scanning signal from the gate line 1, and a pixel electrode 3, to which a video signal is supplied from the drain line 2 through the switching element, are formed. The region which is defined by the pair of adjacent gate lines and the pair of adjacent drain lines constitutes a pixel region. The thin film transistor (TFT) is used as a switching element. The thin film transistor is constituted of a gate electrode G, which is connected to the gate line 1, a polycrystalline silicon film 5, a drain electrode D, which is connected to the drain line 2, and a source electrode S, which is connected to the pixel electrode.

Each pixel is formed in a region defined by two neighboring gate lines 1 and two neighboring drain lines 2. A color image can be displayed on a front surface of a panel using an array of three types of pixels (pixel for red, pixel for green, pixel for blue).

Within one pixel, a common electrode C and a pixel electrode 3 are formed. Further, the common electrode C and the pixel electrode 3 are formed on the same substrate, thus constituting a liquid crystal display device adopting a so-called lateral electric field (In-Plane-Switching) mode of operation. By arranging a common line 6, which is connected to the common electrode C, in parallel and above the gate line 1, the pixel is enlarged.

Figure 11:
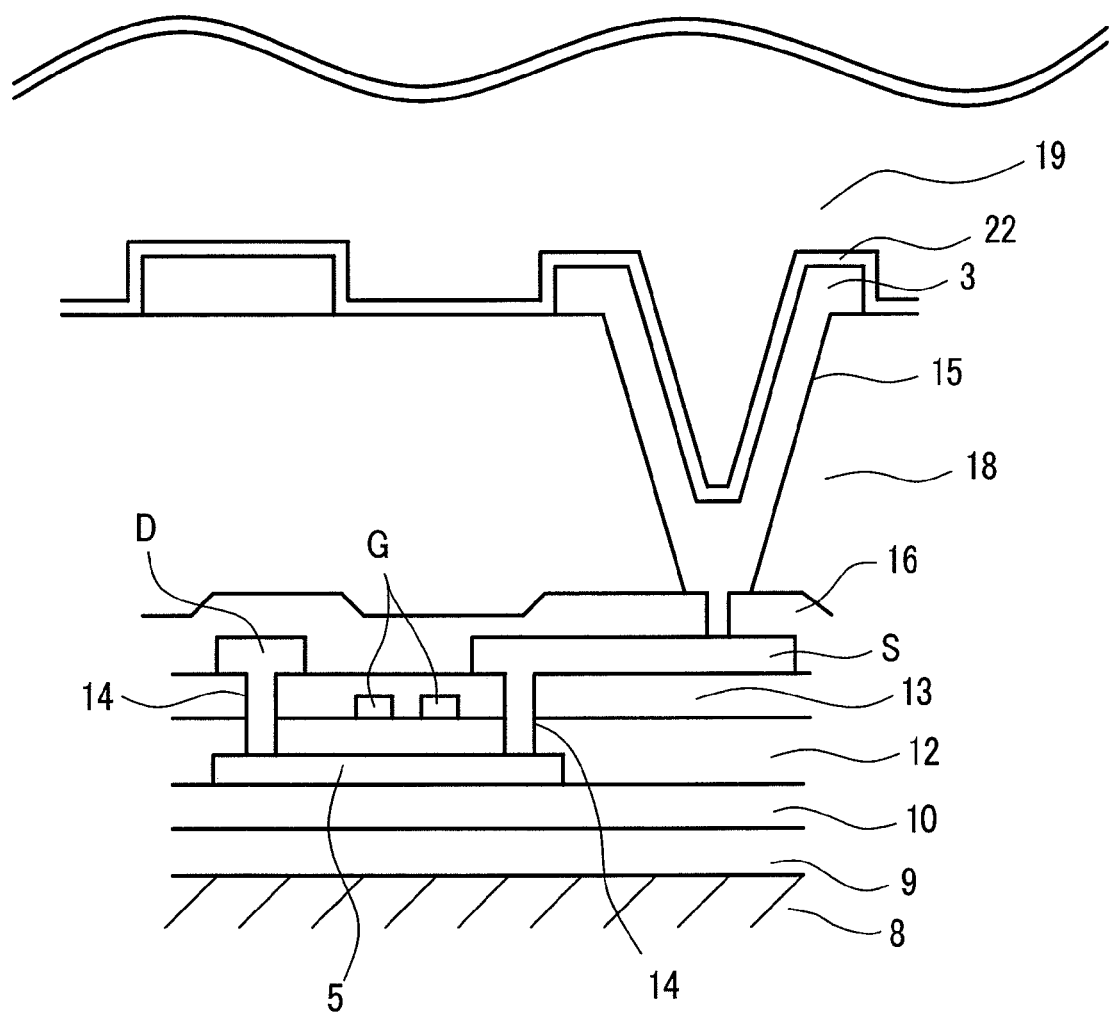
FIG. 11 is a cross-sectional view taken along a line I-I in FIG. 10.

FIG. 11 is a cross-sectional view taken along a line I-I in FIG. 10. The thin film transistors are formed on the glass substrate 8 and the glass substrate 8 is made of glass which is referred to as alkali-free glass. The glass substrate 8 contains impurities, and so there exists the possibility that the impurities will intrude into the polysilicon film 5 and deteriorate the transistor characteristics of the thin film transistors formed on the substrate. To suppress the intrusion of the impurities from the glass substrate 8 to the polysilicon film 5, a background film made of silicon nitride, silicon oxide or the like is formed between the glass substrate 8 and the polysilicon film 5. The background film is formed over the whole surface of the panel, and the light transmissive pixel electrodes 3 and the common electrodes C are formed over the background film along with the thin film transistors.

A first background film 9 is formed over the substrate 8 over which the thin film transistors are formed, while a second background film 10 is formed over the first background film 9. Then, the polysilicon film 5 is formed over the second background film 2. The manner of forming these films, the constitution of and manner of forming the first interlayer insulation film and the second interlayer insulation film are the same as those of the first embodiment.

An organic insulation film 18, which is formed over the second interlayer insulation film, is also referred to as a leveling film. By forming the organic insulation film 18, the surface on which the common electrodes C and the pixel electrodes 3 are formed constitutes a flat surface which is not influenced by surface irregularities of the second interlayer insulation film 16. By providing the organic insulation film 18, the coupling capacitance among wiring consisting of the gate lines, the drain lines and the common lines can be reduced. Due to the reduction of the coupling capacitance, the power consumption of the liquid crystal display device can be reduced.

The common electrodes C and the pixel electrodes 3 are formed over the organic insulation film 18. The common electrodes C and the pixel electrodes 3 are formed within the pixel and are formed of a light transmissive film. For example, as the transparent electrode, ITO (Indium Tin Oxide) can be used.

Contact holes 15 are formed in the second interlayer insulation film 16 and the organic insulation film 18 so as to establish the electrical connection between the source electrode S and the pixel electrode 3.

In this embodiment, the above-mentioned constitution is applied to the liquid crystal display device for a normally black display. In the pixel portion, light transmissive films are stacked and these stacked films differ in refractive index from each other. To prevent the reflection of an external light from the counter substrate side, the film thicknesses of the light transmissive films are controlled.

Figure 12:
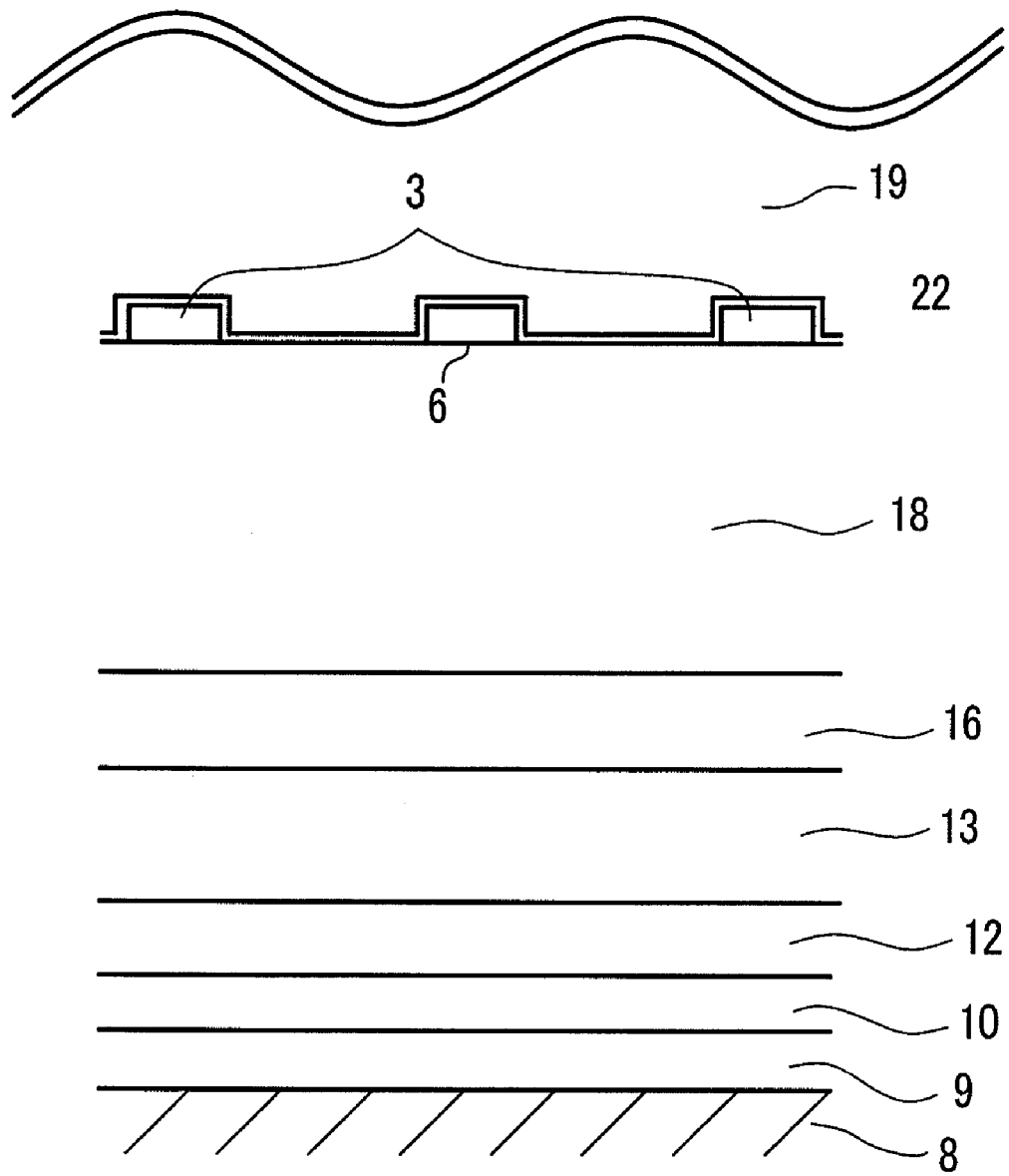
FIG. 12 is a cross-sectional view taken along a line II-I in FIG. 10.

FIG. 12 is a cross-sectional view taken along a line II-II in FIG. 10. Due to the provision of the background films, the developing solution, the etchant, the resist removing liquid or the like is not brought into contact with the glass substrate in the photolithography step, and, hence, it is possible to suppress the dissolving of ions, such as sodium ions, from the glass substrate. If the dissolving of ions can be eliminated, it is possible to reuse these liquids again after filtering them, whereby it is possible to prevent the whole manufacturing line from being subjected to contamination. Further, the manufacturing cost can be reduced.

A gate insulation film 12, a first interlayer insulation film 13, a second interlayer insulation film 16, and an organic insulation film 18 are formed over the second background film in a stacked manner. Over the organic insulation film 18, the pixel electrodes 3 and the common electrodes C are formed on the same substrate. The orientation film 22 is formed over the glass substrate 8 such that the orientation film 22 covers the organic insulation film 18, the pixel electrodes 3 and the common electrodes C. The liquid crystal layer 19 is formed such that the layer is brought into contact with the orientation film 22.

These films are arranged within the pixel and have light transmissive characteristics. Particularly, since a given voltage is applied to the pixel electrodes and the common electrodes, these electrodes are formed of ITO (Indium Tin Oxide), which is a transparent conductive material. By controlling liquid crystal molecules in response to an electric field generated between the pixel electrode and the common electrode, the light transmission quantity is controlled.

As an ideal, the liquid crystal display device is constituted such that the following formula is satisfied, assuming that the film thickness is d(nm) and the refractive index for a wavelength of 555 nm is n (m being an arbitrary integer excluding a negative integer).

$$d=555 \times m/(2 \times n)$$

However, in actual use, in view of manufacturing errors or the like, it is necessary to adjust the film thickness within about 10% of the film thickness in addition to the calculated value. It is preferable to control the film thickness within an error of 10 nm.

Within the pixel region, on the glass substrate 8, there are provided the second background film 10, the gate insulation film 12, the first interlayer insulation film 13 and the leveling film 18, which have a relatively low refractive index, and the first background film 9 and the second interlayer insulation film 16, which have a relatively high refractive index.

The respective films having the relatively high refractive index are configured to each satisfy the following formula, assuming that the film thickness is d (nm) and the refractive index for a wavelength of 555 nm is n (m being an arbitrary integer excluding a negative integer).

$$0.9d \leq 555 \times m/(2 \times n) \leq 1.1d$$

Although the above range allows ±10% of the film thickness as the range of error, when the film thickness d exceeds 200 nm, ±15% of the given film thickness is allowable as the range of error. Due to such a constitution, it is possible to suppress the reflection of an external light attributed to the difference in refractive index when light passes from the film having the high refractive index to the film having the low refractive index, whereby display of an inverted image can be suppressed.

Further, the respective films having a relatively low refractive index are configured to respectively satisfy the following formula, assuming that the film thickness is d (nm) and the refractive index for a wavelength of 555 nm is n (m being an arbitrary integer excluding a negative integer).

$$0.9d \leq 555 \times m/(2 \times n) \leq 1.1d$$

Although the above range allows ±10% of the film thickness as the range of error, when the film thickness d exceeds 200 nm, ±15% of the given film thickness is allowable as the range of error. Due to such a constitution, it is possible to further suppress the reflection of external light in the transmissive region, whereby display of an inverted image can be suppressed.

Figures 13, 14:
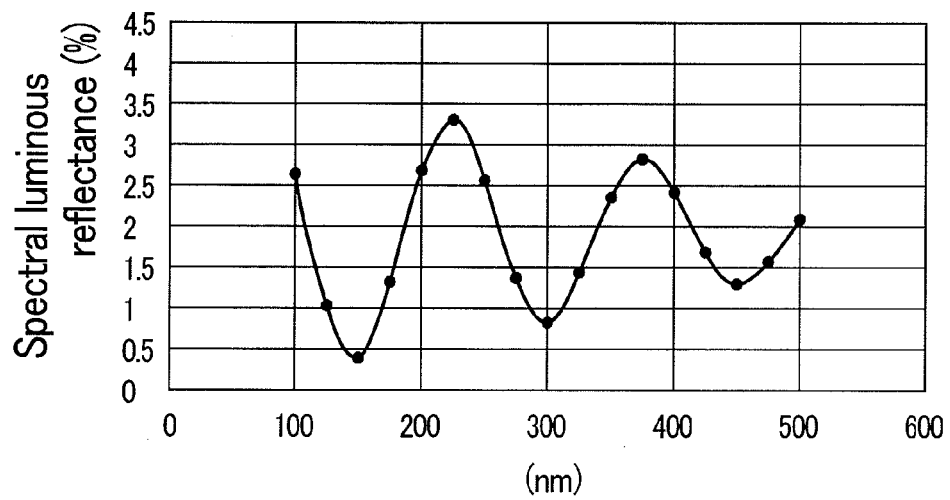
FIG. 13 is a table showing the material and the thickness of films or layers and refractive indices when the wavelength is 555 nm.
FIG. 14 is a graph showing a spectral luminous reflectance when the thickness of a second interlayer insulation film is changed from 100 nm to 500 nm.

FIG. 13 shows a specific example of materials, thicknesses (film thicknesses) and the refractive indices of respective films or layers when the wavelength is 555 mm. In this case, the gap L2 of the transmissive region is set to 5.2 µm.

The first background film and the second background film differ in refractive index. To protect the polysilicon film from the impurities in the glass substrate, the first background film may preferably have a film thickness of at least 45 nm. In this embodiment, the material of the first background film 9 is silicon nitride, the refractive index of the first background film 9 is 1.85, and the film thickness of the first background film 9 is 150 nm. The material of the second background film 10 is silicon oxide, the refractive index of the second background film 10 is 1.5, and the film thickness of the second background film 10 is 100 nm. The first background film is formed thicker than the second background film.

The material of the gate insulation film 12 is silicon oxide in the same manner as the second background film, while the refractive index of the gate insulation film 12 is 1.5 and the film thickness of the gate insulation film 12 is 100 nm. The material of the first interlayer insulation film 13 is silicon oxide in the same manner as the second background film, while the refractive index of the first interlayer insulation film 13 is 1.5 and the film thickness of the first interlayer insulation film 13 is 540 nm. With respect to the second interlayer insulation film 16, the material is silicon nitride, the refractive index is 1.85 and the film thickness is 300 nm. With respect to the leveling film 18, an organic film having a refractive index of 1.6 is used and the film thickness is 1750 nm. With respect to the pixel electrode 3 and the common electrode 6, these electrodes are made of ITO, the refractive index is 2.0 and the film thickness is 140 nm. Further, the refractive indices of the orientation film 22 and the liquid crystal are 1.5.

Among these films, the second background film, which constitutes the liquid-crystal-layer-side background film, has the same refractive index as that of the gate insulation film and the first interlayer insulation film, and, hence, they can be considered as the same film. Accordingly, the first film is the silicon nitride film, which is constituted of the first background film, and, hence, the refractive index is 1.85 and the film thickness is 150 nm. The second film is the silicon oxide film, which is constituted of the second background film, the gate insulation film and the first interlayer insulation film, and, hence, the refractive index is 1.5 and the film thickness is 740 nm. Further, the third film is constituted of the second interlayer insulation film, the fourth film is constituted of the leveling film, and the fifth film is constituted of an ITO film.

The first and the fifth films satisfy the following formula, assuming that the film thickness is d (nm) and the refractive index for a wavelength of 555 nm is n (m being an arbitrary integer excluding a negative integer).

$$d(1-0.1) \leq 555 \times m/(2 \times n) \leq d(1+0.1)$$

On the other hand, the second, the third and the fourth films satisfy the following formula, assuming that the film thickness is d (nm) and the refractive index for a wavelength of 555 nm is n (m being an arbitrary integer excluding a negative integer).

$$d(1-0.15) \leq 555 \times m/(2 \times n) \leq d(1+0.15)$$

Due to such a constitution, the reflection of external light on respective kinds of films formed on the glass substrate 8 in the transmissive region can be suppressed, whereby it is possible to enhance the visibility of an image when the image is displayed by reflecting the external light at the backlight side of the panel. Particularly, the first background film is formed with a large film thickness, and, hence, intrusion of impurities into the polysilicon film from the substrate can be suppressed.

Figure 15:
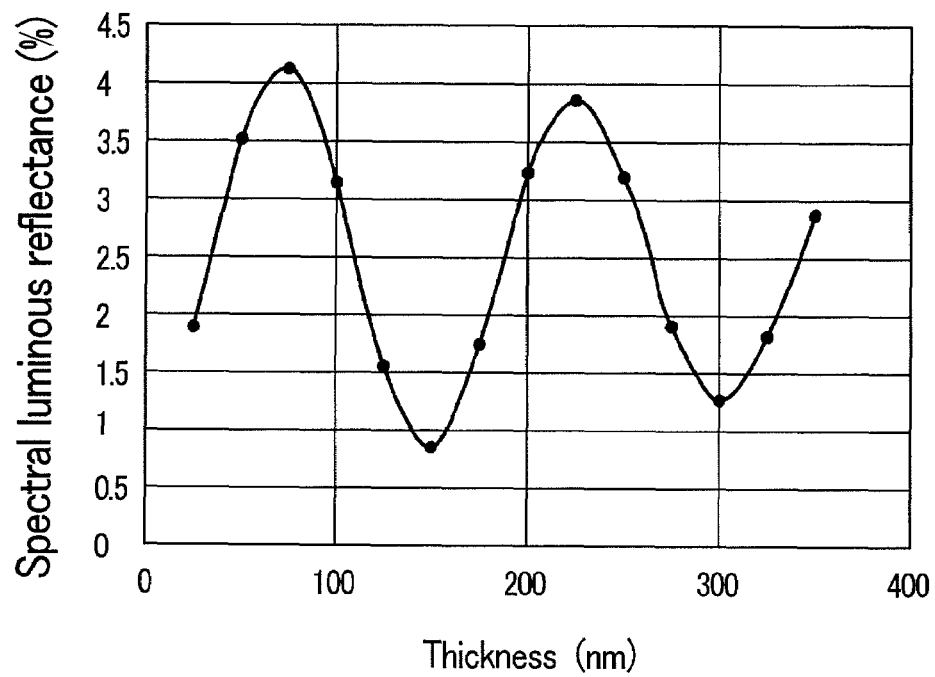
FIG. 15 is a graph showing a spectral luminous reflectance when the thickness of the first background film is changed from 25 nm to 350 nm.

FIG. 14 and FIG. 15 are views showing the spectral luminous reflectance of the region in the pixel where the pixel electrode and the common electrode are not formed.

FIG. 14 is a view showing the spectral luminous reflectance when the first background film, the second background film, the gate insulation film, the first interlayer insulation film, the leveling film and the ITO film assume the values shown in FIG. 13 and the film thickness of the second interlayer insulation film is changed within a range of 100 nm to 500 nm. The spectral luminous reflectance is taken on an axis of ordinates and the film thickness of the second interlayer insulation film is taken on an axis of abscissas. The spectral luminous reflectance, when the film thickness of the second interlayer insulation film is about 150 nm, is about 0.45%, and, hence, the spectral luminous reflectance takes the lowest value. The spectral luminous reflectance assumes the low value next to the lowest when the film thickness of the second interlayer insulation film is about 300 nm. That is, the spectral luminous reflectance is about 0.88%.

FIG. 15 is a view showing the spectral luminous reflectance when the second background film, the gate insulation film, the first interlayer insulation film, the second interlayer insulation film, the leveling film and the ITO film assume the values shown in FIG. 13 and the film thickness of the first background film is changed within a range of 25 nm to 350 nm. The spectral luminous reflectance is taken on an axis of ordinates and the film thickness of the first interlayer insulation film is taken on an axis of abscissas. The spectral luminous reflectance, when the film thickness of the first background film is about 150 nm, is about 0.88%, and, hence, the spectral luminous reflectance takes the lowest value. The spectral luminous reflectance assumes the low value next to the lowest when the film thickness of the first background film is about 300 nm. That is, the spectral luminous reflectance is about 1.33%.

Figure 16:
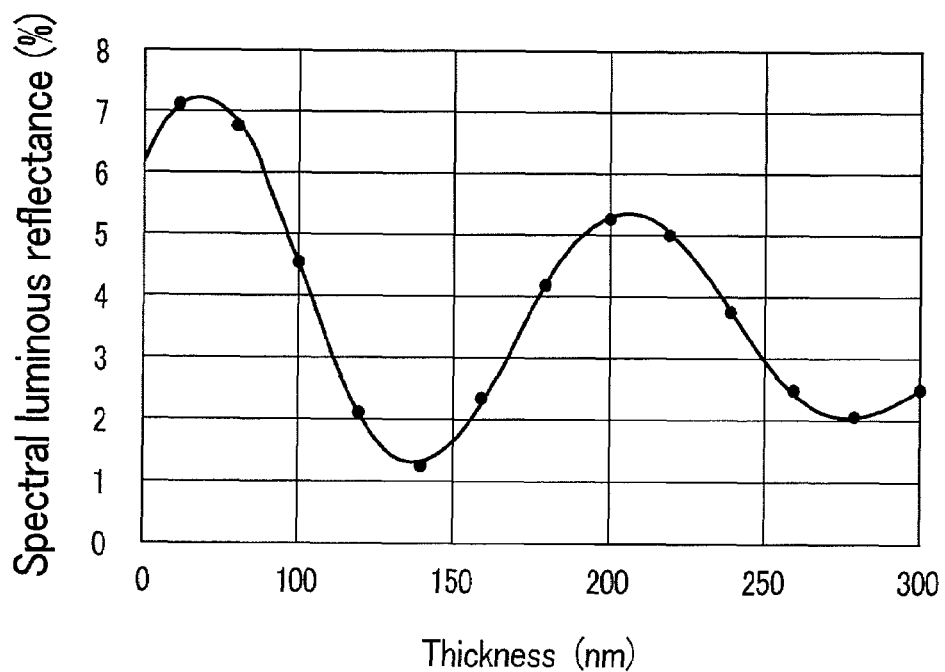
FIG. 16 is a graph showing a spectral luminous reflectance when the thickness of the ITO is changed from 50 nm to 300 nm.
Figure 17:
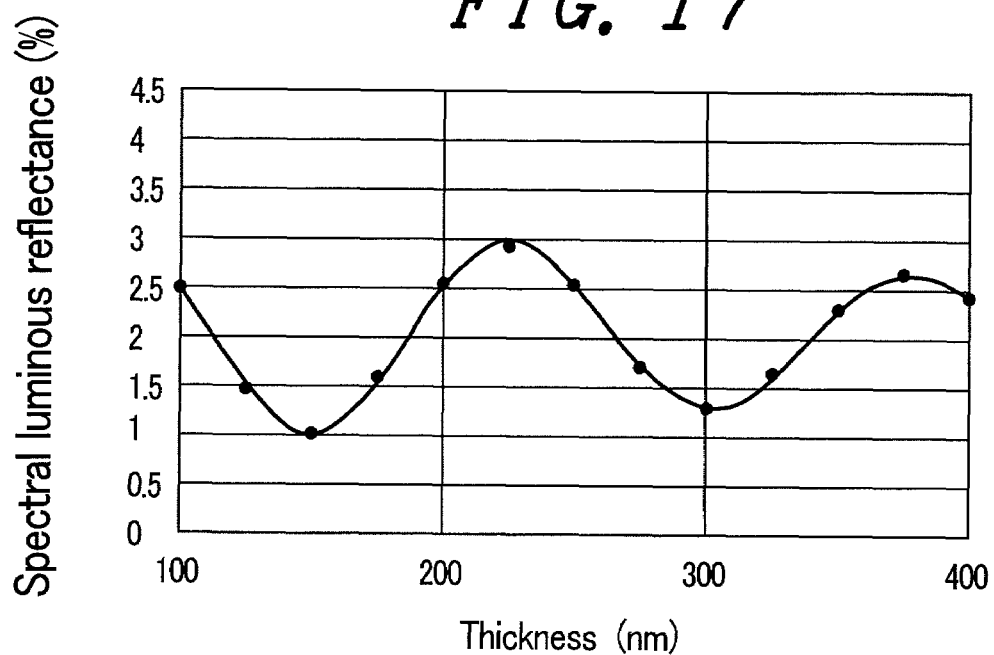
FIG. 17 is a graph showing a spectral luminous reflectance when the thickness of the second interlayer insulation film is changed from 100 nm to 400 nm.
Figure 18:
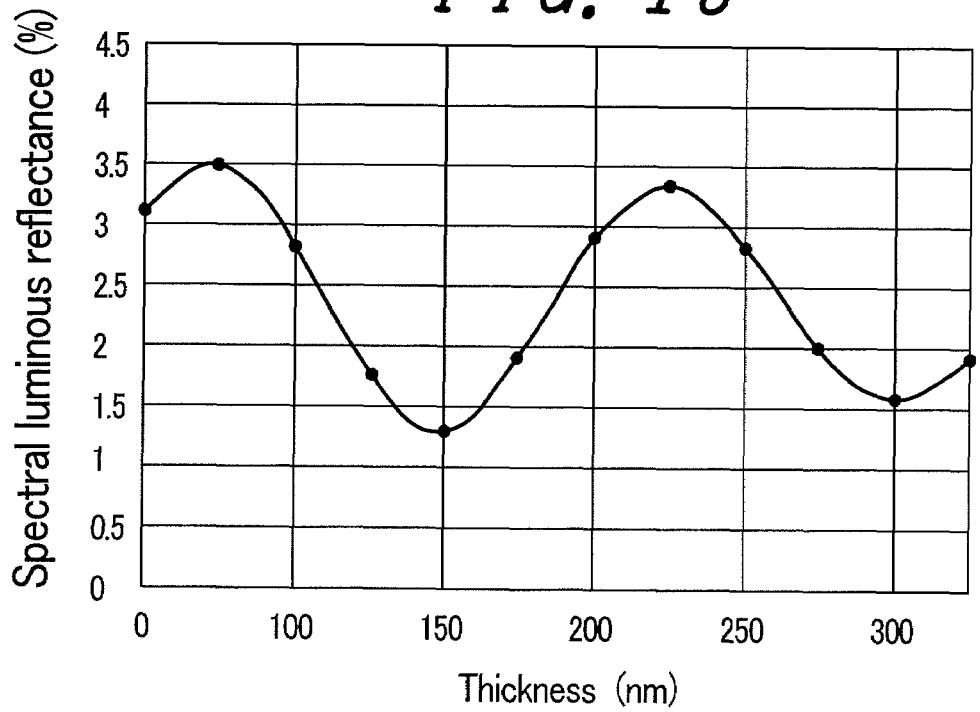
FIG. 18 is a graph showing a spectral luminous reflectance when the thickness of the first background film is changed from 50 nm to 325 nm.

FIG. 16, FIG. 17 and FIG. 18 are views showing the spectral luminous reflectance of the region in the pixel where the pixel electrode and the common electrode are formed.

FIG. 16 is a view showing the spectral luminous reflectance when the first background film, the second background film, the gate insulation film, the first interlayer insulation film, the second interlayer insulation film and the leveling film assume the values shown in FIG. 13 and the film thickness of the ITO film is changed within a range of 50 nm to 300 nm. The spectral luminous reflectance is taken on an axis of ordinates and the film thickness of the ITO film is taken on an axis of abscissas. As shown in FIG. 16, the spectral luminous reflectance, when the film thickness of the ITO film is about 140 nm, is about 1.3%, and, hence, the spectral luminous reflectance takes the lowest value. The spectral luminous reflectance assumes the low value next to the lowest when the film thickness of the ITO film is about 280 nm. That is, the spectral luminous reflectance is about 2.1%.

FIG. 17 is a view showing the spectral luminous reflectance when the first background film, the second background film, the gate insulation film, the first interlayer insulation film, the leveling film and the ITO film assume the values shown in FIG. 13 and the film thickness of the second interlayer insulation film is changed within a range of 100 nm to 400 nm. The spectral luminous reflectance is taken on an axis of ordinates and the film thickness of the second interlayer insulation film is taken on an axis of abscissas. The spectral luminous reflectance, when the film thickness of the second interlayer insulation film is about 150 nm, is about 1.02%, and, hence, the spectral luminous reflectance takes the lowest value. The spectral luminous reflectance assumes the low value next to the lowest when the film thickness of the second interlayer insulation film is about 300 nm. That is, the spectral luminous reflectance is about 1.3%.

FIG. 18 is a view showing the spectral luminous reflectance when the second background film, the gate insulation film, the first interlayer insulation film, the second interlayer insulation film, the leveling film and the ITO film assume the values shown in FIG. 13 and the film thickness of the first background film is changed within a range of 50 nm to 325 nm. The spectral luminous reflectance is taken on an axis of ordinates and the film thickness of the first interlayer insulation film is taken on an axis of abscissas. The spectral luminous reflectance, when the film thickness of the first background film is about 150 nm, is about 1.3%, and, hence, the spectral luminous reflectance takes the lowest value. The spectral luminous reflectance assumes the low value next to the lowest when the film thickness of the first background film is about 300 nm. That is, the spectral luminous reflectance is about 1.56%.

In this example, in addition to results shown in FIG. 14 and FIG. 17, from a viewpoint of reduction of capacitance and reduction of contamination attributed to the organic film, the film thickness of the second interlayer insulation film is set to 300 nm and the film thickness of the first background film is set to 150 nm in view of FIG. 15 and FIG. 18. Due to such a constitution, it is possible to suppress the interface reflection which appears when light advances from a film having a relatively high refractive index to a film having a relatively low refractive index.

Figure 19:
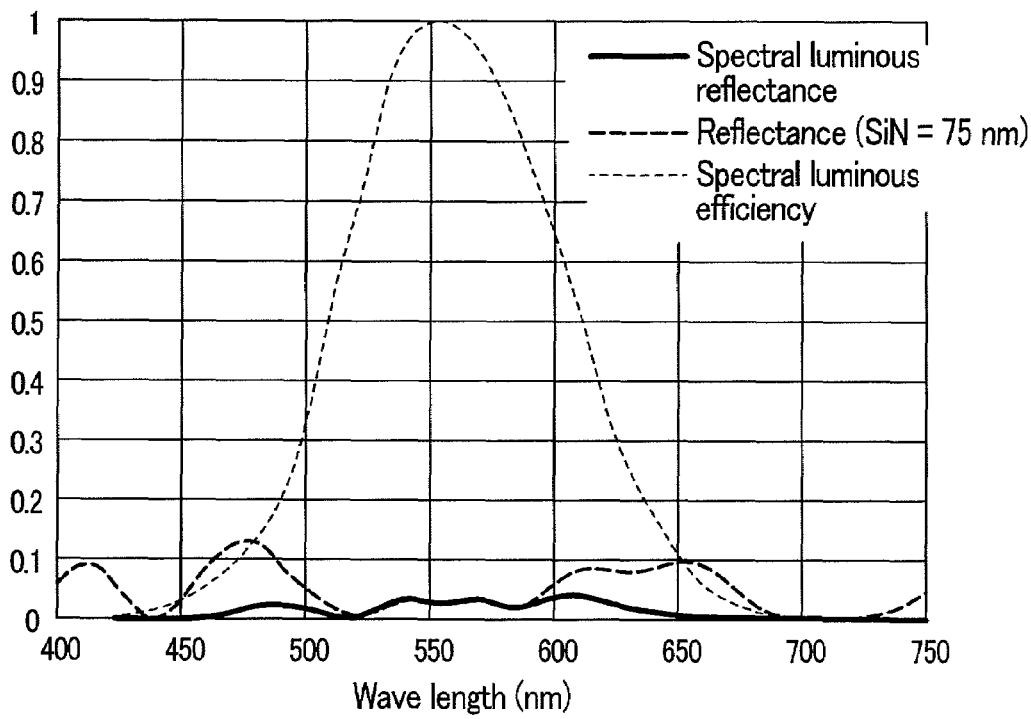
FIG. 19 is a graph showing the relationship between the wavelength of light and the spectral luminous reflectance when the thickness of the first background film is 75 nm.
Figure 20:
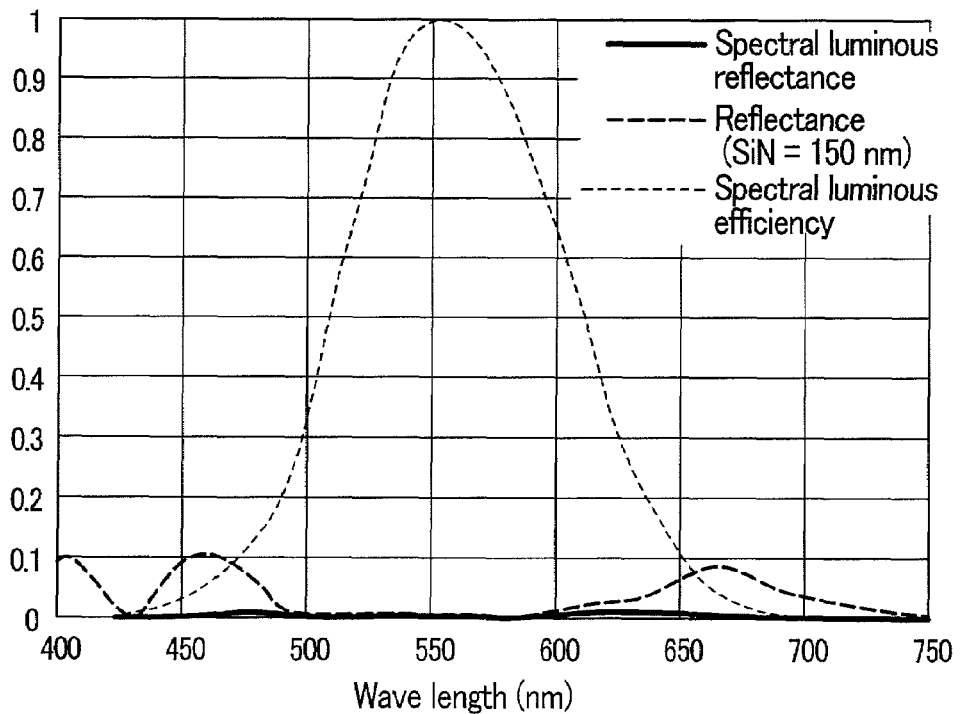
FIG. 20 is a graph showing the relationship between the wavelength of light and the spectral luminous reflectance when the thickness of the first background film is 150 nm.

FIG. 19 is a view showing the relationship between the wavelength of light and the spectral luminous reflectance when the thickness of the first background film is 75 nm, and FIG. 20 is a graph showing the relationship between the wavelength of light and the spectral luminous reflectance when the thickness of the first background film is 150 nm. In FIG. 19 and FIG. 20, the reflectance (%), the spectral luminous reflectance (%) and visibility are taken on the axis of ordinates and the wavelength (nm) of light is taken on an axis of abscissas. Here, the visibility is set to 1 when the wavelength is 555 nm, which gives the strongest visibility to the human eye. In FIG. 19, the visibility is about 0.028 when the wavelength is 555 nm.

On the other hand, in FIG. 20, the visibility when the wavelength is 555 nm is about 0.0009, and, hence, the reflection light having the wavelength of 555 nm can be suppressed to an extent that the human eye can hardly recognize the reflection light. The human eye is most sensitive to light having a wavelength of 555 nm, and, hence, the contrast can be enhanced by suppressing the reflection of light having a wavelength in the vicinity of 555 nm.

The reflective light from the multilayered film is generated such that, since the refractive indices of the respective layers which constitute the multilayered film are different from each other, interface reflections occur between respective layers, and these interface reflections interfere with each other, thus generating the reflection light.

Figure 21:
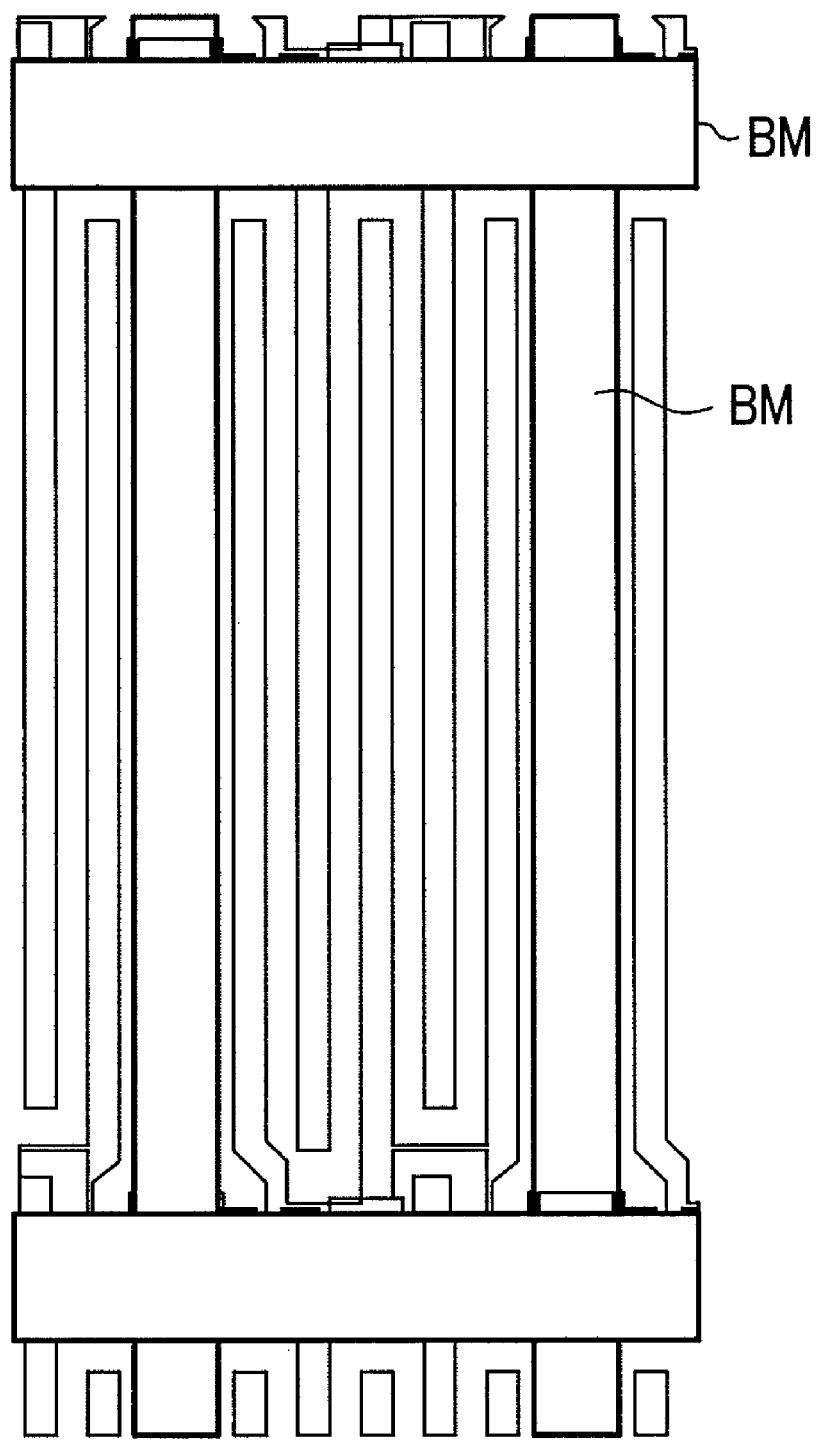
FIG. 21 is a diagrammatic plan view showing the structure when a second substrate on which color filters are formed is overlapped with a first substrate.

FIG. 21 is a plan view as seen when the second substrate 7 on which color filters are formed is overlapped to the first substrate 4. Particularly, FIG. 21 is a view which illustrates the positional relationship between the positions of the drain lines and gate lines formed on the first substrate with the position of the black matrixes BM formed on the second substrate. The color filters and the black matrixes BM are formed on the second substrate 7.

In the full transmissive type liquid crystal display device, the external light is reflected by the drain lines and the gate lines which are formed of a metal thin film, and, hence, the contrast of the images is degraded. Accordingly, the black matrixes BM are arranged to overlap the drain lines and the gate lines. Due to such an arrangement of the black matrixes BM, the degradation of the contrast of images can be suppressed.

Figure 22:
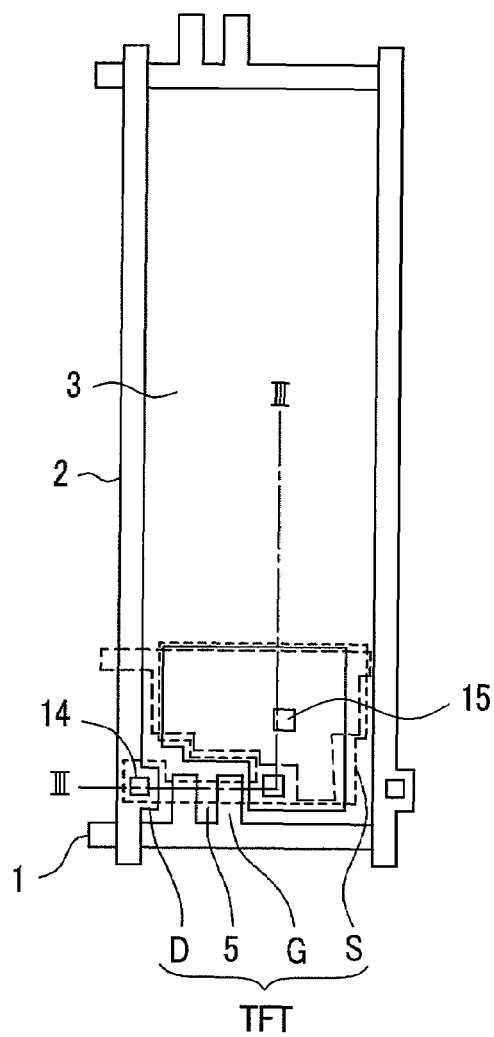
FIG. 22 is a diagrammatic plan view showing a pixel region of a liquid crystal display device representing a third embodiment of the present invention.

FIG. 22 is a plan view of a liquid crystal display device according to a third embodiment, in which a substrate on which pixel electrodes are formed and a substrate on which common electrodes are formed are arranged to face each other in an opposed manner with a liquid crystal layer disposed therebetween. To parts shown in FIG. 22 which have the identical functions as those of the first embodiment, the same reference symbols are given. Further, the embodiment shown in FIG. 22 is applied to a full transmissive type display device, which includes no reflective electrodes for displaying images by reflecting an external light on pixel portions.

Hereinafter, the point which makes this embodiment different from the second embodiment will be explained in detail.

The thin film transistors and the pixel electrodes 3 are formed on one of the two substrates which face each other in an opposed manner with the liquid crystal layer disposed therebetween. In each pixel portion, in the same manner as the first embodiment, gate electrodes G, drain electrodes D, source electrodes S, gate lines 1, drain lines 2, the pixel electrodes 3, a polysilicon film 5, a contact hole 14 for forming a thin film transistor TFT, and contact holes 15 are formed. The constitution which makes this embodiment largely different from the first embodiment lies in the fact that common electrodes are not formed on the same layer as the pixel electrodes 3 and the fact that storage lines (storage electrodes) 6 are formed on the same layer as the gate lines. By providing these storage lines, the holding capacitance of the pixel electrodes can be increased.

Figure 23:
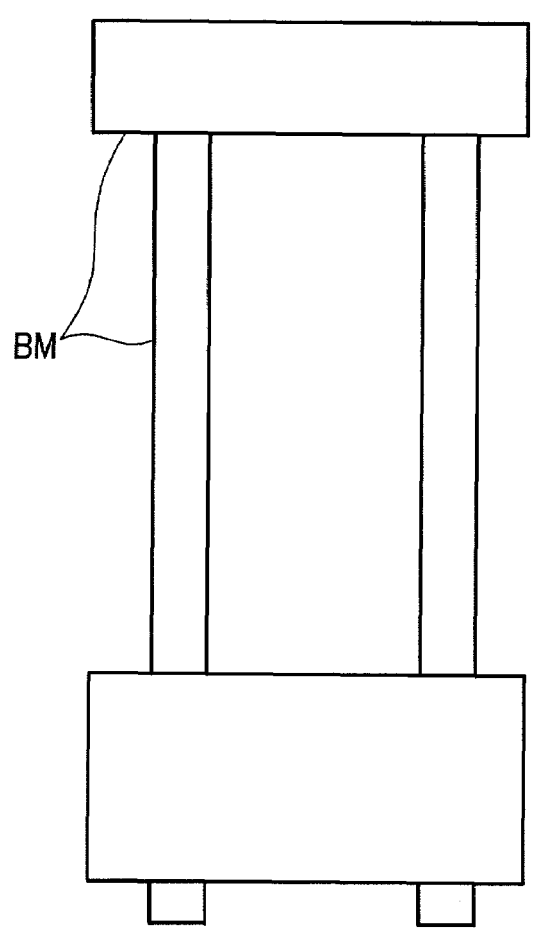
FIG. 23 is a diagrammatic plan view of black matrixes BM formed on the second substrate.

FIG. 23 is a plan view of black matrixes BM which are formed on the second substrate 7 (color filter substrate). The black matrixes BM are arranged such that the black matrixes BM cover the gate electrodes G, the drain electrodes D, the source electrodes S, the gate lines 1, the drain lines 2 and the storage lines 6, all of which constitute metal portions in FIG. 22. By arranging the black matrixes BM in such a manner, the reflection of the external light by the metal portions can be prevented, and, hence, the contrast can be enhanced. Further, the counter electrodes (common electrodes) C are formed on a surface of the second substrate 7 which faces the liquid crystal layer. An orientation film is formed over the second substrate 7 such that the orientation film also covers the counter electrodes C.

Figure 24:
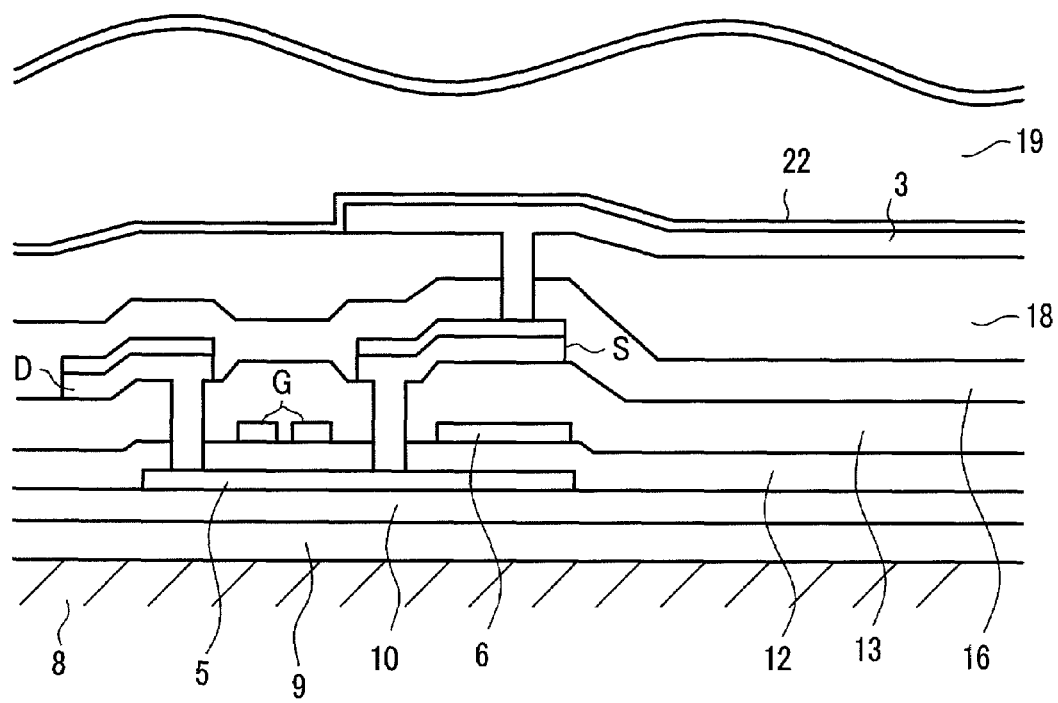
FIG. 24 is a cross-sectional view taken along a line III-III in FIG. 22.

FIG. 24 is a cross-sectional view taken along a line III-III in FIG. 22. The first background film 9 and the second background film 10 are formed over the glass substrate 8, and the polysilicon film 5 is formed on the second background film 10. The gate insulation film 12 is formed so as to cover the polysilicon film 5, and the gate electrodes G are formed on the gate insulation film. Further, the storage electrodes 6, which are formed on the same layer as the gate electrodes G, are formed over the gate insulation film 12. The first interlayer insulation film 13 is formed such that the first interlayer insulation film 13 covers the gate electrodes G, the storage electrodes 6 and the gate insulation film. The contact holes 14 are formed in portions of the first interlayer insulation film 13 and the gate insulation film so that respective connections between the polysilicon film 5 and gate electrodes G and between the polysilicon film 5 and the source electrodes S can be established. The drain electrodes D and the source electrodes S, which are formed on the first interlayer insulation film, have a three-layered structure consisting of a titanium-tungsten layer as a lower layer, an aluminum layer as an intermediate layer and a titanium-tungsten layer as an upper layer. In FIG. 24, the lower layer and the intermediate layer are shown as one film. The titanium-tungsten layer constituting the upper layer ensures the electrical connection with the pixel electrodes 3. The second interlayer insulation film 16 is formed such that the insulation film 16 covers the drain electrodes, the source electrodes and the first interlayer insulation film, while the organic insulation film 18 is formed such that the insulation film 18 covers the second interlayer insulation film. Contact holes 15 are formed in portions of the organic insulation film, and this enables the connection between the source electrodes and the pixel electrodes. ITO (Indium Tin Oxide) is used as a material of the pixel electrodes. An orientation film 22 is formed over a surface of the first substrate over which these layers are respectively formed and which faces the liquid crystal layer 19.

On the pixel region, the light transmissive films are laminated and these laminated films have different refractive indices. To prevent the reflection of the external light from the counter substrate side, the film thicknesses of the light transmissive films are controlled.

Also, in the third embodiment, the film thicknesses are configured to respectively satisfy the following formula, assuming that the film thickness of each film is d (nm) and the refractive index for a wavelength of 555 nm (m being an arbitrary integer excluding a negative integer) is n.

$$d = 555 \times m/(2 \times n).$$

Further, considering manufacturing errors, the visibility or the like, it is necessary to reduce or add the thickness of approximately 10% of the film thickness in addition to the calculated value. The film thickness is favorably controlled within an error of 10 nm.

That is, the film thicknesses are configured to respectively satisfy the following formula, assuming that the film thickness of each film is d (nm) and the refractive index for the wavelength of 555 nm (m being an arbitrary integer excluding a negative integer) is n.

$$0.9d \leq 555 \times m/(2 \times n) \leq 1.1d.$$

Further, in view of the allowable range of the visibility, when the film thickness d exceeds 200 nm, ±15% of the given film thickness is allowable. That is, the film thicknesses are configured to respectively satisfy the following formula, assuming that the film thickness of each film is d (nm) and the refractive index for the wavelength of 555 nm (m being an arbitrary integer excluding a negative integer) is n.

$$0.85d \leq 555 \times m/(2 \times n) \leq 1.15d.$$

The specific thickness is shown in FIG. 13.

By constituting the laminated film structure in this manner, the reflection of external light attributed to the difference of the refractive index when the light passes from the film having a high refractive index to the film having a low refractive index can be suppressed, and display of an inverted image can be suppressed.

Figure 25:
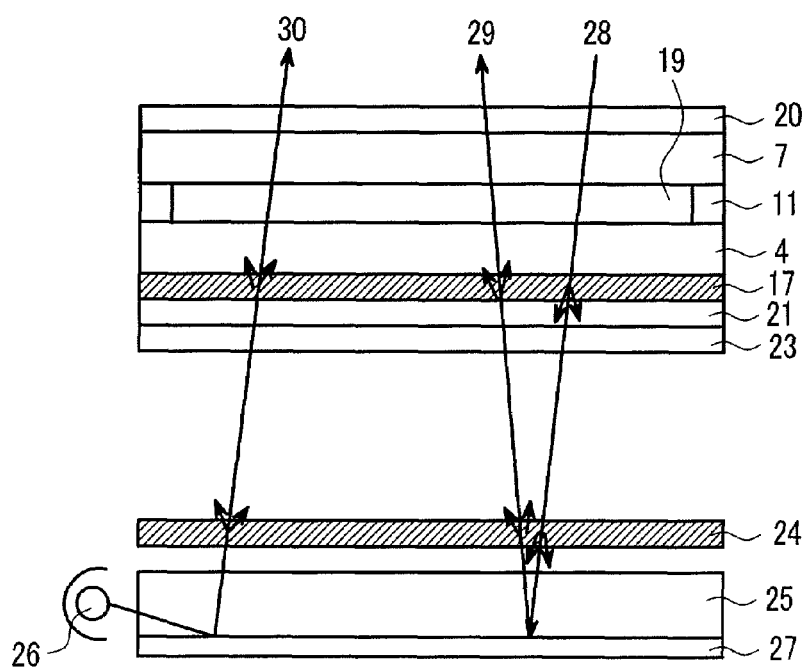
FIG. 25 is a cross-sectional view of the liquid crystal display device, showing the arrangement of a backlight structural body.

FIG. 25 is a cross-sectional view of the liquid crystal display device, illustrating the arrangement of a backlight structural body which is used in common by the embodiments of the present invention.

The first substrate 4 and the second substrate 7 are arranged to face each other in an opposed manner while sandwiching the liquid crystal layer 19 therebetween. The first substrate and the second substrate are fixed by a sealing material 11.

The polarizer 20 is arranged on the image display surface side (image observing surface side) of the second substrate, and the polarizer 21 is also arranged on the backlight side (opposite to the image observing surface side) of the first substrate. Further, a light diffusion layer 17 is disposed between the first substrate 7 and the polarizer 21. Further, a reflection polarizer 23 is arranged on the backlight side of the polarizer 21.

The backlight structural body is constituted of at least a light guide plate 25, a light source 26 and a reflection plate 27. A light diffusion sheet 24 may be arranged on the front surface of the light guide plate 25 when necessary.

The light diffusion layer 17 is made of a diffusion tacky adhesive material. The diffusion tacky adhesive material has both a light diffusion function and a function of fixing the polarizer and the first substrate. Further, the light diffusion sheet 24 is arranged in front of the polarizer (observing window side) so as to diffuse light.

The light 28 incident from the observing window to the panel is diffused by the light diffusion layer 17 and the light diffusion sheet 24 and reaches the reflection plate 27. The reflected light 29 is also irradiated from the panel after passing through the diffusion sheet and the light diffusion layer 17, and, hence, the light is sufficiently diffused whereby the luminance mottling can be suppressed. Further, the occurrence of a shadow of the image which is generated when the image is observed in an oblique direction can be prevented, and, hence, the image recognition is improved. Particularly, the lateral field type liquid crystal display device has a wide viewing angle, and, hence, the present invention is preferably applicable to such a display device. Further, with the provision of the reflection polarizer 23, the external light can be effectively used.

On the other hand, the light 30 irradiated from the light source 26 of the backlight passes through the light guide plate 25 and is bent toward the image display surface side. The light 30 is also diffused by the light diffusion sheet and the light diffusion layer, and, hence, the luminance mottling on the image display surface can be suppressed. With such a constitution, when the surrounding environment is dark, the image is displayed using light from the backlight, and when the environment is bright, the image is displayed by reflecting the external light. Particularly, the inverted display of the image, which may occur when the image is displayed by reflecting the external light, can be suppressed.

Further, it is also possible to use both the external light and the backlight. In this case, even when the surrounding environment is bright, an image display having a favorable contrast can be produced.

Further, in the above-mentioned embodiments, although the first substrate 4 is described as a glass substrate, a similar drawback arises so long as the substrate needs a background film. The first substrate may be formed of a substrate other than a glass substrate. Further, even other than the background film, by applying the above-mentioned constitution to a structure which is formed by forming the multilayered film in the light transmissive portion, the image recognition can be improved.

In the application which constitutes a basis for claiming the internal priority with respect to the present application, the film thickness of the nitride silicon is defined as $$d \pm 10 = 555 \times m/2 \times n.$$

However, in this previous domestic application, as clearly shown in FIG. 5, FIG. 6 and FIG. 7, it is found that when the film thickness of the background film is set to 140 nm, the spectral luminous reflectance becomes minimum. That is, the previous domestic application is based on the assumption that, when the film thickness of the background film is d (nm) and the refractive index for a wavelength of 555 nm is n, the following formula is satisfied.

$$d = 555 \times m/2 \times n$$

Further, the previous domestic application also indicates that it is necessary to adjust the film thickness of the background film to within approximately 10% of the film thickness considering manufacturing error, and the film thickness is favorably controlled with an allowable error of 10 nm. That is, according to the technical concept of the present invention, it is a requisite that, assuming that the film thickness of the background film is d (nm) and the refractive index for a wavelength of 555 nm is n, the following formula is satisfied.

$$d - 10 \leq 555 \times m/(2 \times n) \leq d + 10$$

However, in the specification of the previous domestic application, there existed some deficiencies in the description of the formula.

In the display device of the present invention, it is preferable to set the film thickness of the nitride silicon of the background film within a range of 140 nm±10 nm (within a range of 130 nm to 150 nm) which provides the minimum spectral luminous reflectance. However, this range is a value which is obtained when the refractive index of the nitride silicon is set to 2.0 and the refractive index of the nitride silicon varies within a range of 2.0 to 1.85. When the refractive index is set to 1.85, it is preferable to set the film thickness within a range of 150 nm±10 nm (within a range of 140 nm to 160 nm). Accordingly, by taking the change of the refractive index of the nitride silicon into consideration, it is preferable that the film thickness of the nitride silicon of the background film is set within a range of 130 nm to 160 nm.

Further, in the specification of the previous domestic application, it is indicated that it is necessary to increase or decrease the film thickness of the nitride silicon of the background film within 10% of the thickness by taking manufacturing error into consideration. Under such a condition, when the refractive index of the nitride silicon of the background film is 2.0, it is necessary to adjust the film thickness within a range of 140 nm±14 nm, that is, within a range of 126 nm to 154 nm. Further, when the refractive index of the nitride silicon of the background film is 1.85, it is necessary to adjust the film thickness within a range of 150 nm±15 nm, that is, within a range of 135 nm to 165 nm. Accordingly, by taking the change of the refractive index of the nitride silicon into consideration, it is necessary to adjust the film thickness of the nitride silicon of the background film within a range of 126 nm to 165 nm. Further, there may be a case in which the film thickness of the nitride silicon changes within approximately 15% depending on the manufacturing device or the manufacturing process being employed. In such a case, it is necessary to set the film thickness of the nitride silicon of the background film in a range of about 120 nm to 170 nm. Even within this range, it is possible to decrease the reflection of the nitride silicon compared to the conventional technique. Further, as mentioned above, to protect the polysilicon film from the impurities of the substrate, it is sufficient that the film thickness of the nitride silicon which constitutes the first background film is set to a value equal to or more than 45 nm. The film thickness of the nitride silicon background film shown in FIG. 4 within a range of 50 nm to 180 nm is a range determined by focusing on the advantageous effect of reducing the intrusion of the impurities from the substrate. Accordingly, to increase this advantageous effect in decreasing the reflection of the nitride silicon film further, it is favorable to restrict the film thickness in a narrower range.

Here, the relationship between the film thickness of the background nitride silicon film and the spectral luminous reflectance shown in FIG. 5 is obtained by setting the refractive index of the nitride silicon film to about 2 (roughly 1.98). FIG. 5 also shows a case in which the refractive index is set to 1.85. However, the refractive index of the nitride silicon film changes from 1.8 to 2.1 according to the properties of the manufacturing device or the manufacturing process being employed. Accordingly, by setting the film thickness to 132 nm when the refractive index of the nitride silicon is 2.1 and by setting the film thickness to 154 nm when the refractive index is 1.8, the spectral luminous reflectance assumes the minimum value. That is, taking the change of the refractive index of the nitride silicon film of the background film into consideration, by setting the film thickness of the nitride silicon of the background film within a range of 132 nm to 154 nm, the spectral luminous reflectance can be suppressed to a low value.

Here, considering that the refractive index of the background film changes from 1.8 to 2.1, when the film thickness is adjusted within a range of 10 nm, as mentioned above, it is favorable to set the film thickness to a value which falls within a range of 122 nm to 164 nm. Further, when the film thickness of the nitride silicon of the background film is adjusted within a range of 10% of the thickness, it is necessary to adjust the film thickness of the nitride silicon of the background film in a range of 118 nm to 169 nm.

The restriction of the film thickness of the nitride silicon background film described here relates to the film thickness of the transmissive portion within the pixel region.

Although values of the film thickness have been described heretofore, it is preferable to set these values as follows. That is, assuming that the film thickness of the background film of the nitride silicon is d (nm) and the refractive index for a wavelength of 555 nm is n, it is favorable to set the film thickness such that a following formula is satisfied $$d-10 \leq 555 \times m/(2 \times n) \leq d+10$$

when the film thickness is suppressed within a range of ±10 nm, and $$d \times (1-0.01 \times a) \leq 555 \times m/(2 \times n) \leq d+(1+0.01 \times a)$$

when the film thickness is suppressed in a range of ±a %.

According to the present invention, by reducing the reflection of light from the transmissive region, a contrast which is formed by the reflective pixel electrode, the liquid crystal layer arranged above the reflective pixel electrode, the optical retardation plate, and the polarizer can be enhanced. Further, the present invention also provides a display device exhibiting an enhanced visibility of images when the images are displayed by reflecting external light on the back surface side of the first substrate. Still further, it is possible to enhance the visibility of images even when the reflective light and the light from the backlight are used simultaneously.

The invention claimed is:

1. A display device comprising:
a first glass substrate having a gate line, a drain line, a pixel electrode and a thin film transistor;
a second glass substrate having a color filter; and
a liquid crystal layer;
wherein a first background film made of silicon nitride is formed on the glass substrate;
wherein a second background film made of silicon oxide is formed on the first background film;
wherein the thin film transistor is formed on the second background film, and the thin film transistor includes a poly-silicon film, a gate electrode which is electrically connected to the gate line, a drain electrode which is electrically connected to the drain line, and a source electrode which is electrically connected to the pixel electrode;
wherein the pixel electrode including a light transmissive electrode forming a transmissive region;
wherein a gate insulation film is formed between the second background film and the gate electrode;
wherein an interlayer film is arranged close to the gate insulation film and interposed between the gate insulation film and the pixel electrode;
wherein a film thickness of the silicon nitride film is larger than a film thickness of the silicon oxide film at the transmissive region; and
wherein the silicon nitride film and the silicon oxide film are configured so as to reduce reflection.

2. A display device according to claim 1, wherein the interlayer film includes a first interlayer insulation film and a second interlayer insulation film which is formed between the first interlayer insulation film and the pixel electrode which is made of ITO.

3. A display device according to claim 2, wherein the gate insulation film and the first interlayer insulation film are made of a same material.

* * * * *